US008141214B2

(12) United States Patent
Barnes

(10) Patent No.: US 8,141,214 B2
(45) Date of Patent: Mar. 27, 2012

(54) PATTERNING TECHNIQUE

(75) Inventor: Jhane Barnes, New York, NY (US)

(73) Assignee: Tandus Flooring, Inc., Dalton, GA (US)

( * ) Notice: Subject to any disclaimer, the term of this patent is extended or adjusted under 35 U.S.C. 154(b) by 0 days.

(21) Appl. No.: 13/086,680

(22) Filed: Apr. 14, 2011

(65) Prior Publication Data

US 2011/0185548 A1 Aug. 4, 2011

Related U.S. Application Data

(60) Division of application No. 12/583,449, filed on Aug. 20, 2009, now Pat. No. 7,968,165, which is a continuation of application No. PCT/US2008/002361, filed on Feb. 22, 2008.

(60) Provisional application No. 60/903,113, filed on Feb. 23, 2007.

(51) Int. Cl.
*B32B 3/14* (2006.01)
*B44C 1/28* (2006.01)
*D05C 15/04* (2006.01)

(52) U.S. Cl. ............. 28/100; 52/311.1; 428/44; 428/47; 428/48; 428/85; 428/89; 428/434; 428/633

(58) Field of Classification Search .................... 28/100; 52/311.1; 428/44, 47, 85, 88, 89, 434, 633
See application file for complete search history.

(56) References Cited

U.S. PATENT DOCUMENTS 3,067,701 A 12/1962 Wilcox
3,850,783 A 11/1974 Peters et al.
3,875,716 A * 4/1975 Eusemann .................. 52/311.2
4,000,707 A 1/1977 Spirer
4,546,025 A 10/1985 Vaisman
5,011,411 A 4/1991 Loewy
5,094,178 A 3/1992 Watkins
5,959,632 A 9/1999 Hashimoto et al.
6,841,216 B2 1/2005 Daniel et al.
6,908,656 B2 6/2005 Daniel et al.
7,083,841 B2 8/2006 Oakey et al.
7,297,385 B2 11/2007 Daniel et al.
7,350,443 B2 4/2008 Oakey et al.
7,601,413 B2 10/2009 Daniel et al.
2001/0017017 A1* 8/2001 Pacione ..................... 52/506.05
2003/0118774 A1 6/2003 Tippett et al.
2003/0164130 A1 9/2003 Morgante
2004/0154682 A1 8/2004 Perez
2006/0233996 A1 10/2006 Oakey et al.

(Continued)

FOREIGN PATENT DOCUMENTS

DE 101 40 384 A1 3/2003

(Continued)

*Primary Examiner* — Brent Ohern
(74) *Attorney, Agent, or Firm* — Womble Carlyle Sandridge & Rice, LLP

(57) ABSTRACT

A method of making a textile pattern includes forming a design module having a substantially square shape, forming a motif from the design module by repeating the design module to form a unitary array of design modules, where the design modules of the unitary array of design modules have various orientations with respect to one another in fixed positions within the unitary array, and repeating the motif along a length and a width of a continuous textile web so that the continuous textile web comprises a first occurrence of the motif and a second occurrence of the motif.

89 Claims, 34 Drawing Sheets

U.S. PATENT DOCUMENTS

| | | | |
|---|---|---|---|
| 2006/0240210 | A1 | 10/2006 | Daniel et al. |
| 2006/0240211 | A1 | 10/2006 | Daniel et al. |
| 2006/0275578 | A1 | 12/2006 | Jones |
| 2008/0041277 | A1 | 2/2008 | Tick et al. |
| 2008/0041286 | A1 | 2/2008 | Tick et al. |
| 2010/0086722 | A1 | 4/2010 | Barnes |

FOREIGN PATENT DOCUMENTS

| | | | |
|---|---|---|---|
| GB | 2 400 315 | | 10/2004 |
| WO | WO 99/31310 | A1 | 6/1999 |
| WO | WO 2007/146140 | A2 | 12/2007 |
| WO | WO 2008/103449 | A1 | 8/2009 |

* cited by examiner

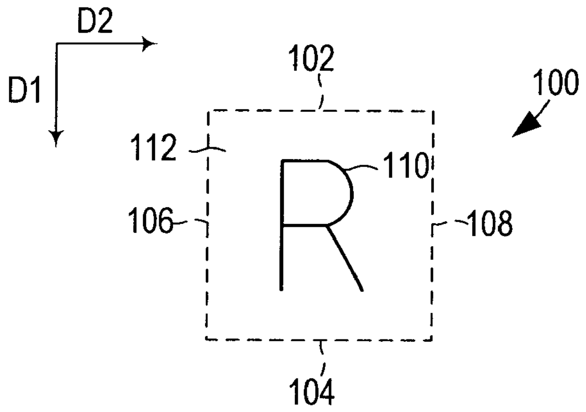
FIG. 1A
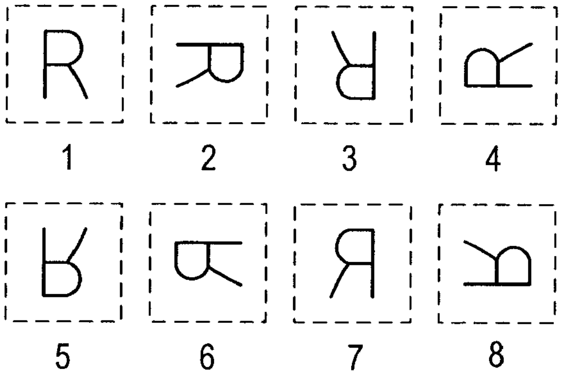
FIG. 1B
114
| | | | |
|---|---|---|---|
| 4 | 1 | 1 | 5 |
| 1 | 7 | 7 | 2 |
| 8 | 7 | 6 | 1 |
| 6 | 7 | 5 | 3 |
FIG. 1C
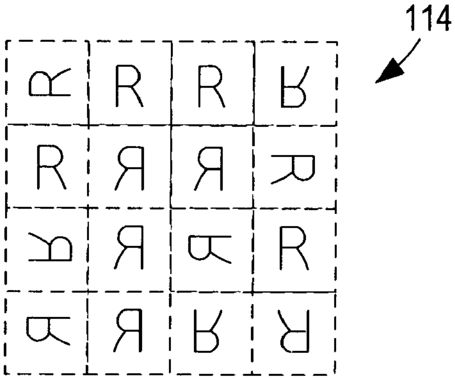
FIG. 1D

720

722

PATTERNING TECHNIQUE

CROSS-REFERENCE TO RELATED APPLICATIONS

This application is a divisional of U.S. patent application Ser. No. 12/583,449, filed Aug. 20, 2009, now U.S. Pat. No. 7,968,165, which is a continuation of International Application No. PCT/US2008/002361, filed Feb. 22, 2008, which claims the benefit of U.S. Provisional Application No. 60/903,113, filed Feb. 23, 2007, each of which is incorporated by reference herein in its entirety.

TECHNICAL FIELD

The present disclosure is directed generally to a patterning technique. More particularly, the disclosure is directed to a patterning technique for textiles or other materials that facilitates alignment of the pattern along seams and, in doing so, creates new, visually pleasing patterns.

BACKGROUND

Patterned textiles and fabrics are used frequently in a variety of applications, including, for example, carpet, garments, wallpaper, and upholstery. In many instances, the alignment of patterns between two or more textile pieces results in a substantial amount of waste. Thus, there is a need for a patterning technique that facilitates alignment of patterns between textiles and reduces the amount of waste generated.

SUMMARY

This disclosure relates generally to a patterning technique for textiles and patterns formed according to the patterning technique. The patterning technique facilitates alignment of two or more textile pieces, thereby simplifying use of the textiles and reducing the amount of waste associated with creating a visually pleasing pattern along and across seams.

The textile pattern generally comprises a design or motif repeated across the length and width of a textile. The motif comprises an arrangement of substantially square, substantially identical design modules variously oriented with respect to one another in fixed positions within the motif. Each design module includes at least two visually distinct hues.

A module used in accordance with the invention generally includes one or more features or characteristics that allow the module to form a visual connection or link with an adjacent module in the motif. The visual connection may be a "perfect" edge alignment or an "imperfect" edge alignment that is nonetheless visually pleasing.

To form a pattern according to the invention, a design module having an initial orientation is rotated and/or inverted to prepare a plurality of new module orientations. The variously oriented modules are arranged in a tiled configuration such that adjacent modules are contiguous with one another (e.g., abutting or touching) within the tiled array of modules, with each module in the motif having the initial orientation or one of the new orientations. The collective design of the oriented modules in the array defines a motif, which may be repeated across the length and width of a textile web.

A patterned textile according to the invention may be used or installed readily. With a slight adjustment of one or more adjacent pieces of the textile, alignment of the patterns along and cross a seam can be achieved without having to remove and/or discard a significant portion of the textile piece. Each of the various possible alignments may result in a different overall pattern for the abutted and/or adjoined textile pieces. Nonetheless, the vague or seemingly random nature of the pattern within the motif renders the resulting overall pattern both unique and visually pleasing.

The motif then may be used to form a textile (not shown) according to any suitable technique, method, or process. Typically, the textile is formed as a roll good. However, textile sheets and other structures are contemplated. In one example, the textile is a carpet including a plurality of tufted yarns. In another example, the textile is a fabric for a garment, upholstery, linens, or other application. In still other examples, the textile is a rug, carpet tiles, or other woven structure. Numerous other textile applications are contemplated.

To convert the roll good into a carpet installation, garment, or other product, pieces of the textile are cut, aligned, and/or joined as needed. In a typical carpet installation, pieces of the carpet are abutted along respective edges to fill the desired space, for example, a hallway or room. The carpet pattern is aligned along seams to create a visually pleasing, seemingly continuous piece of carpet. However, alignment of the pattern along the seams often results in a significant amount of waste and/or unsatisfactory installation. The present invention addresses this problem by designing the module and, therefore, the motif, such that when a first piece of carpet is installed, an adjacent piece need only be adjusted slightly to align the pattern across the seam. In doing so, a variety of overall carpet patterns may be created, each of which is visually pleasing.

Likewise, to form a garment, upholstery, or other fabric-based product, the various pieces are cut as needed, abutted and/or overlapped as needed, and optionally joined to form seams. If desired the visual appearance of the seams may be accentuated or minimized by aligning the pattern of the textile across the seams. In doing so, the patterning technique of the invention facilitates alignment of the textile pattern and, therefore, minimizes waste.

Other aspects, features, and advantages of the present invention will become apparent from the following description and accompanying figures.

BRIEF DESCRIPTION OF THE DRAWINGS

The description refers to the accompanying schematic drawings, in which like reference characters refer to like parts throughout the several views, and in which:

FIG. 1A depicts a generic "R" module used to illustrate various aspects of the invention;

FIG. 1B depicts various orientations of the module of FIG. 1A;

FIG. 1C depicts a tiled arrangement of module orientations;

FIG. 1D depicts an exemplary arrangement of "R" modules having various orientations corresponding to the arrangement of module orientations of FIG. 1C;

DESCRIPTION

Figure 2A:
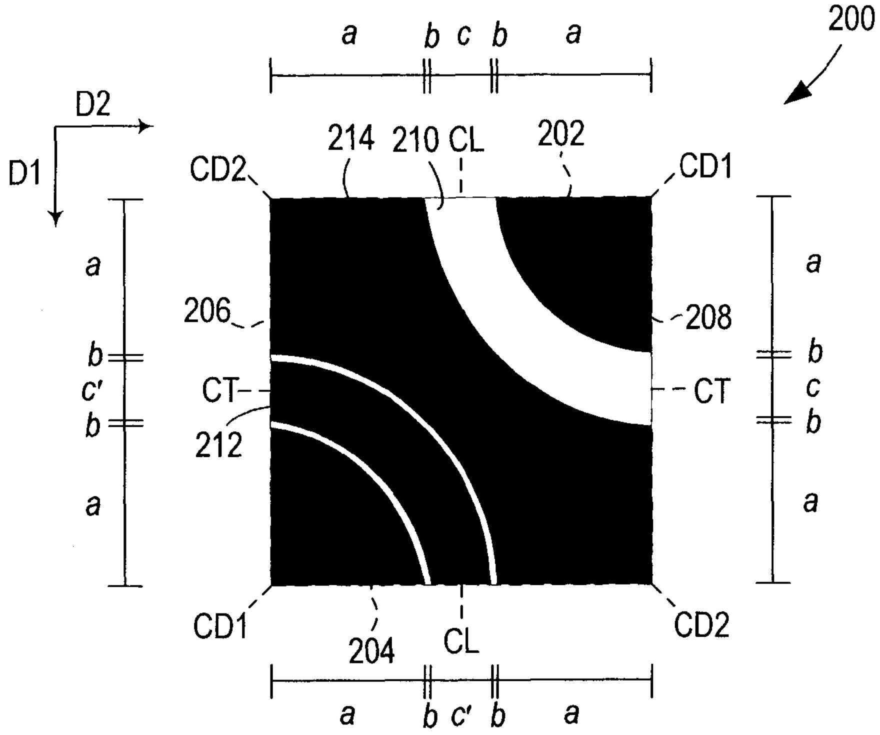
FIG. 2A depicts an exemplary module that may be used to form a textile pattern.

This disclosure is directed generally to various textile patterns and a patterning technique for forming such patterns. The patterning technique and resulting textile patterns facilitate alignment of textile pieces along and across seams and reduce the amount of waste typically associated with such alignment.

The various patterns comprise a design or motif repeated, for example, along the length and width of a textile. Each occurrence of the motif in the overall textile pattern includes a plurality of design elements that serve as "connection points" that are capable of being abutted with other design elements along a seam to define one or more new elements or designs. Although the new elements may disrupt the pattern of repeating motifs, the connection points in each piece allow the overall pattern across adjacent pieces to be perceived as continuous.

Each motif can be divided into a plurality of design "modules" arranged in a tiled (i.e. block repeat) configuration or array. Each module is substantially square in shape and includes at least two visually distinct hues. Typically, the more prominent feature within the module defines a foreground pattern of the textile, with the remainder of the textile pattern comprising a field. However, the converse is contemplated. The particular arrangement of hues in the module forms a portion or segment of the motif.

Each module within a motif is substantially identical to each other module within the motif, but the modules are variously, and sometimes randomly, oriented with respect to one another in fixed positions within the motif. The orientation of each module may be upright, inverted, and/or rotated 90°, 180°, or 270° with respect to one another. Each arrangement of variously oriented modules forms a unique motif. Thus, for a given module design, countless motifs may be formed. The motif may be symmetrical or asymmetrical, depending on the particular design of the module and the arrangement of modules.

A module suitable for use with the patterning technique may have one or more of various features that facilitate the formation of an optical or visual connection with the edge of an adjacent, variously oriented module, such that the design elements of one module are contiguous with or complementary to the design elements on an adjacent module. The connection may comprise a "match" of adjacent design elements or a visually pleasing "mismatch." As a result, when two or more variously oriented modules are arranged edge-to-edge, each module forms a portion of an overall, harmonious design.

More particularly, each module includes at least one edge having an arrangement of design elements and/or hues that corresponds to or coordinates with the design elements and/or hues along at least one other edge. The lateral alignment of such edges may result in a "perfect" match of design elements and/or hues, such that the design elements and/or hues appear to extend continuously or "flow" from one module to the other, or an "imperfect" match, in which the design elements and/or hues do not flow continuously from one module to the other. A perfect edge alignment generally results in the linkage of design elements across the respective modules, while an imperfect edge alignment may create the appearance of a break or discontinuity in the flow of a particular design element. Nonetheless, the lateral alignment of any module edge with any other module edge is visually pleasing. Accordingly, any module having any orientation may be placed adjacent to any other module having any orientation and still make a visually pleasing connection. Depending on the particular characteristics of the module, the resulting motif and overall textile pattern may be relatively "open" (i.e., may have a greater % area that comprises the field) or may be relatively "closed" or interconnected (i.e., may have a greater % area that comprises foreground elements).

In some examples, one or more edges may be characterized as having bidirectional symmetry, such that the arrangement of design elements and/or hues along the respective edge is symmetric about a midpoint of the respective edge. Despite such edge symmetry, a lateral alignment of modules may result in an imperfect match or a perfect match, depending on the hues associated with each edge. In one particular example, each of the edges has a substantially identical bidirectional alignment of hues, such that any edge readily forms a perfect visual connection with any other edge.

Although some examples may feature such edge symmetry, it will be understood that the overall symmetry of the module may vary. Generally, each module may be asymmetric across at least one centerline that bisects the module. The module may have an overall degree of symmetry ("symmetry degree") of 0, such that the module is asymmetric across any bisecting centerline, 1, such that the module is symmetric across one bisecting centerline, or 2, such that the module is symmetric across two bisecting centerlines. It will be understood that where the module includes at least one line of symmetry, the module also will have at least two edges with a substantially identical arrangement of hues. However, the module may have one or more edges with bidirectional symmetry without being symmetrical across any bisecting centerline. The degree of symmetry determines the number of distinct orientations of the module and contributes to the appearance of the overall design created by the variously oriented modules in the motif, as will be illustrated with reference to the examples.

Since each motif comprises an array of optically connecting modules, adjacent motifs also are capable of optically connecting to one another to form a visually continuous design. As a result, regardless of the orientation of each particular module, any module can be placed next to any other module without disrupting the overall pattern of the textile. The number available connection points between adjacent motifs depends on the number of modules in the motif. For example, a motif that comprises 16 modules across the array (i.e., in a row) and 16 modules down the array (i.e., in a column) has 16 connection points in each row and 16 connection points in each column. Accordingly, the pattern on adjacent textile pieces may be aligned across a seam by making only a minor adjustment of one piece relative to another to bring a module of the first piece into alignment with a module on the second piece. Thus, adjacent textile pieces may be aligned readily with little waste.

In some instances, the design elements on one module of a motif may align with adjacent design elements to form all or a portion of a new design element. The new design element may have a closed shape (i.e. no open ends) or open shape (i.e. one or more open ends capable of further connections), and generally differs in appearance from a mere side-by-side tiling of similarly oriented modules. Although the new element may not be present in the motif and/or may not conform to the arrangement of elements within the motif, the presence of the new element is difficult to discern. Thus, two or more textile pieces can be arranged in numerous ways and still form a seemingly continuous overall design.

Various aspects of the patterning technique may be understood with reference to the figures. For purposes of simplicity, like numerals may be used in the figures to describe like features. It will be understood that where a plurality of similar features are depicted, not all of such features are necessarily labeled on each figure.

It is noted that each module is described as being substantially "square" in shape with a plurality of peripheral edges or boundaries including a first or "top" edge, a second or "bottom" edge, a third or "left" edge, and a fourth or "right" edge. However, it will be understood that, the arrangement of hues may not include a square shaped border or defined edges. Rather, the modules are defined in this manner to provide a convenient means of describing the arrangement of the hues within the confines of the module and to assist with understanding the patterning technique and patterns of the invention.

Likewise, each module is characterized as having a plurality of centerlines, including a longitudinal centerline, a transverse centerline, a first diagonal centerline, and a second diagonal centerline, each of which bisects the module, only some of which may be labeled on the figures. The longitudinal centerline and transverse centerline extend between respective pairs of opposed edges of the module, while the first and second diagonal centerlines extend between respective pairs of opposed corners of the module. It will be understood that these positional and directional characterizations are made for discussion purposes only, and are not intended to be limiting in any manner.

FIG. 1A depicts a generic "R" module 100 that can be used to illustrate various aspects of the patterning technique. The module 100 can be characterized as having a substantially square shape defined by a plurality of peripheral boundaries or edges 102, 104, 106, 108, each of which is shown as a black dashed line. With the module in this initial, upright orientation, opposed edges 106, 108 extend substantially in a first direction D1 (also referred to throughout as a longitudinal direction) and are substantially parallel to one another. Opposed edges 102, 104 extend substantially in a second direction D2 (also referred to throughout as a transverse direction) and are substantially parallel to one another. The first direction D1 and the second direction D2 are substantially perpendicular to one another.

The module 100 includes a foreground design element 110 and a field 112. In this example, the design element 110 is shown as the letter "R" in black and the field 112 is shown as solid white. However, it will be understood that various other hues and combinations of hues may be used. Thus, the design element may be lighter or darker than the field, and the field may be lighter or darker than the design element. It also is contemplated that with some modules, it may be difficult to discern which elements comprise the foreground and the field. The precise characterization of each design element is not critical to the invention, as will be evident from the examples.

The module 100 can be reoriented in numerous ways, as illustrated in FIG. 1B. Orientation 1 is the module in its original orientation with the "R" in an upright configuration. Orientation 2 is the module rotated 90 degrees to the right relative to orientation 1. Orientation 3 is the module rotated an additional 90 degrees relative to orientation 2. Orientation 4 is the module rotated another 90 degrees relative to orientation 3. Orientation 5 is the module in its original orientation inverted or flipped downward. Orientation 6 is the module of Orientation 5 rotated 90 degrees to the right relative to orientation 5. Orientation 7 is the module rotated an additional 90 degrees relative to orientation 6. Orientation 8 is the module further rotated an additional 90 degrees relative to orientation 7.

Since the "R" module is wholly asymmetric (symmetry degree 0), each orientation has a different appearance than each other orientation. However, as will be seen with reference to the remaining examples, a module having a degree of symmetry other than 0 typically results in some orientations that have the same appearance as some other orientations. Stated differently, a module having a symmetry degree of 0 typically has in eight distinct orientations, while a module with at symmetry degree of at least 1, 2, or 3 typically has in fewer than eight distinct orientations. In particular, a module having a symmetry degree of 1 (i.e., symmetric across one centerline) typically has four distinct orientations, and a module having a symmetry degree of 2 (i.e., symmetric across two centerlines) typically has two distinct orientations. A module having a symmetry degree of 3 (i.e., symmetric across three centerlines) is wholly symmetric and typically has only one distinct orientation.

Returning to the figures, a tiled arrangement or array 114 of variously oriented modules 100 may be prepared. The selection of each orientation may be made manually or by using a computer or other device, and may be purposeful or random. Each position in the array corresponds to a position identifier, as shown in FIG. 1C, which can be replaced with the corresponding module, as shown in FIG. 1D. In the example shown in FIGS. 1C and 1D, the array includes 4 rows and 4 columns and therefore may be referred to as a "4 by 4 array" (or "4×4 array") of modules. In this example, the arrangement includes a total of 16 modules. However, other arrangements are contemplated by the invention.

The generic "R" module can be replaced with various modules to form numerous textile motifs and textile patterns, some of which are presented in the following examples. It will be understood that countless other motifs and patterns may be formed according to the patterning technique, and that such patterns are contemplated by the invention.

Example 1

FIG. 2A depicts an exemplary module 200 that may be used in accordance with the patterning technique. For purposes of simplicity and not limitation, the module 200 is depicted as having a substantially square shape defined by a plurality of theoretical peripheral boundaries or edges 202, 204, 206, 208, each of which is shown in dashed form. However, the module 200 does not include a defined border, as will be evident from the remaining figures. A first arc 210 extends between edge 202 and edge 208, with the endpoints of the arc 210 being substantially centered along the length of edges 202, 208. Likewise, a second arc 212 extends between edges 204, 206, with the endpoints of the arc 212 being substantially centered along the length of edges 204, 206, respectively. The module also includes a field 214, shown in black. The module 200 is symmetrical along a first diagonal centerline CD1 and asymmetrical across the remaining centerlines CT, CL, and CD2, such that the module 200 has an overall degree of symmetry of 1.

It will be appreciated that the various components that comprise a particular module may be described and/or represented in numerous ways. For example, in this illustration, the first arc 210 is shown in white. The second arc 212 could be described as being black with a white border or, alternatively, could be described as a pair of white arcs, each having endpoints along the respective edges, with the black interior space being part of the field. For ease of discussion, and not limitation, the second arc 212 is characterized herein as a single arc having white edges and a black interior space. It also will be appreciated that arcs 210, 212 and the field 214 may vary in color. Any combination of colors may be used as desired, with the field color being lighter or darker than the foreground pattern.

As shown in FIG. 2A, each edge 202, 204, 206, 208 can be divided into various segments a, b, c, c', with respective segments a having a substantially equal length, respective segments b having a substantially equal length, and respective segments c, c' having a substantially equal length, such that the arrangement of segment lengths is symmetrical along each edge 202, 204, 206, 208.

Each segment may be associated with a particular portion of a design element and/or a particular hue. In this example, the arrangement of design elements and/or hues is substantially identical and symmetrical along edges 202, 208, such that edges 202, 208 readily form a perfect alignment with one another. Likewise, the arrangement of design element and/or hues is substantially identical and symmetrical along edges 204, 206, such that edges 204, 206 readily form a perfect alignment with one another. In contrast, other edge combinations (i.e., 202 or 208 with 204 or 206) result in the imperfect alignment of segments c, c'. Nonetheless, there is a seemingly continuous flow of elements from one module to the next, as will be apparent from the remaining figures.

Figure 2B:
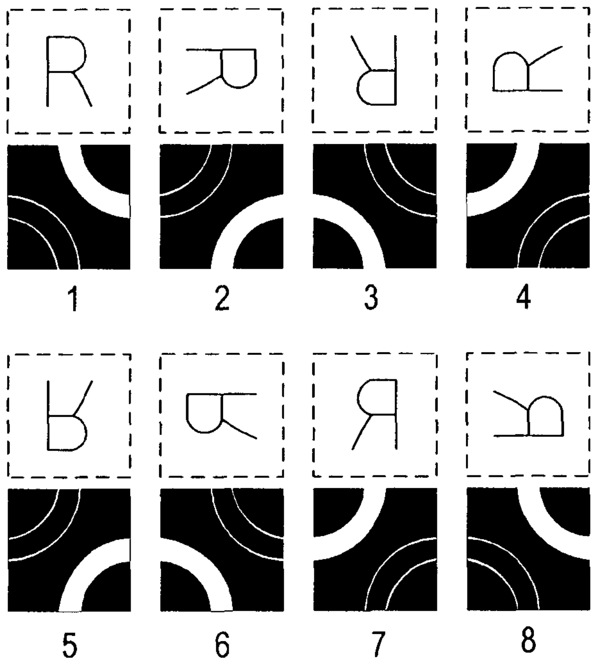
FIG. 2B depicts various orientations of the module of FIG. 2A.

Turning to FIG. 2B, the module 200 can be reoriented in a manner similar to that described in connection with FIG. 1B. For clarity and ease of illustration, the corresponding "R" orientation is provided above each oriented module. By examining the various oriented modules, it will be evident that for some module designs, some rotations and/or inversions will result in modules having the same appearance. In this example, orientation 1 appears the same as orientation 8, orientation 2 appears the same as orientation 5, orientation 3 appears the same as orientation 6, and orientation 4 appears the same as orientation 7. Thus, there are four distinct orientations.

Figure 2C:
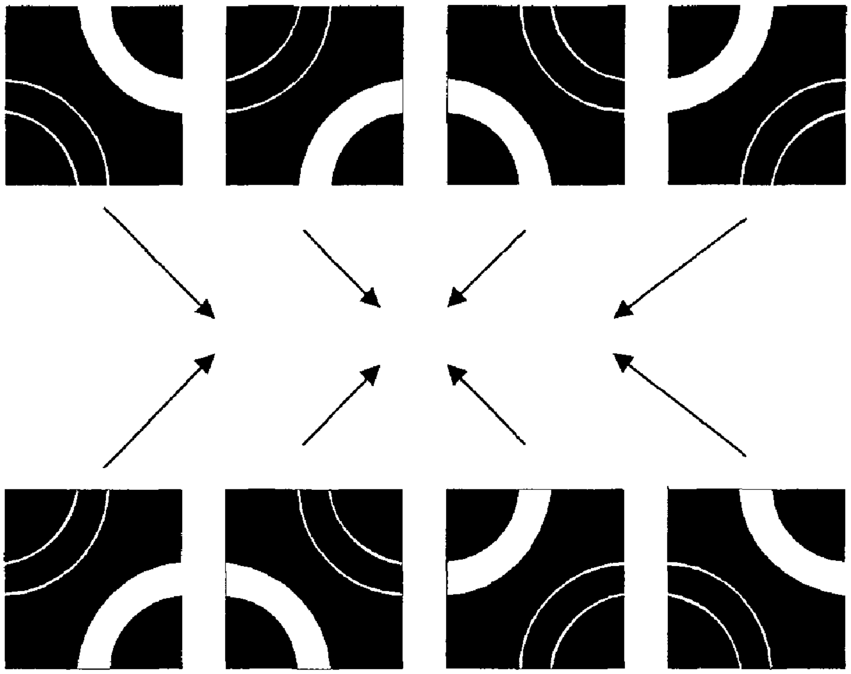
FIGS. 2C and 2D schematically depict the orientations of FIG. 2B being brought together to form a design.
Figure 2D:
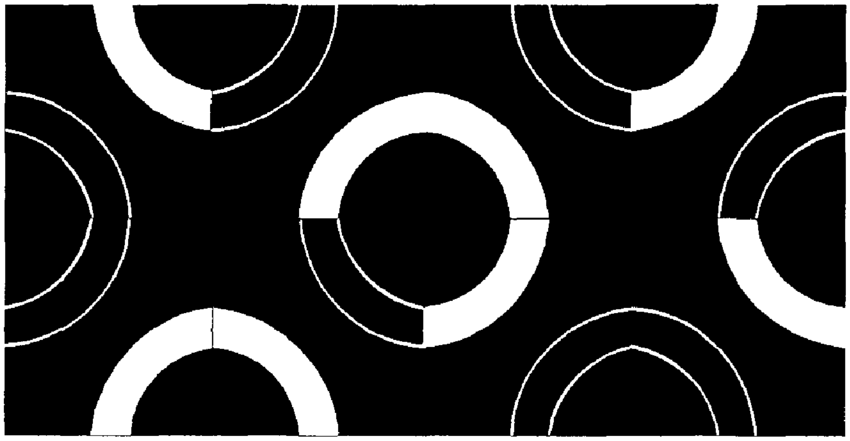

As stated above, each module may be positioned next to the same module having any orientation. By way of example, as shown in FIGS. 2C and 2D, the various module orientations 1-8 may be brought together such that adjacent modules are contiguous with one another (e.g., abutting or touching) to define a pattern of sinuous shapes against a black field. As shown in FIG. 2D, each module forms a perfect or imperfect optical connection with the edge of the adjacent module(s). Further, the design elements on each of the variously oriented adjacent modules respectively and collectively define a plurality of new elements, for example, circles.

Figure 2E:
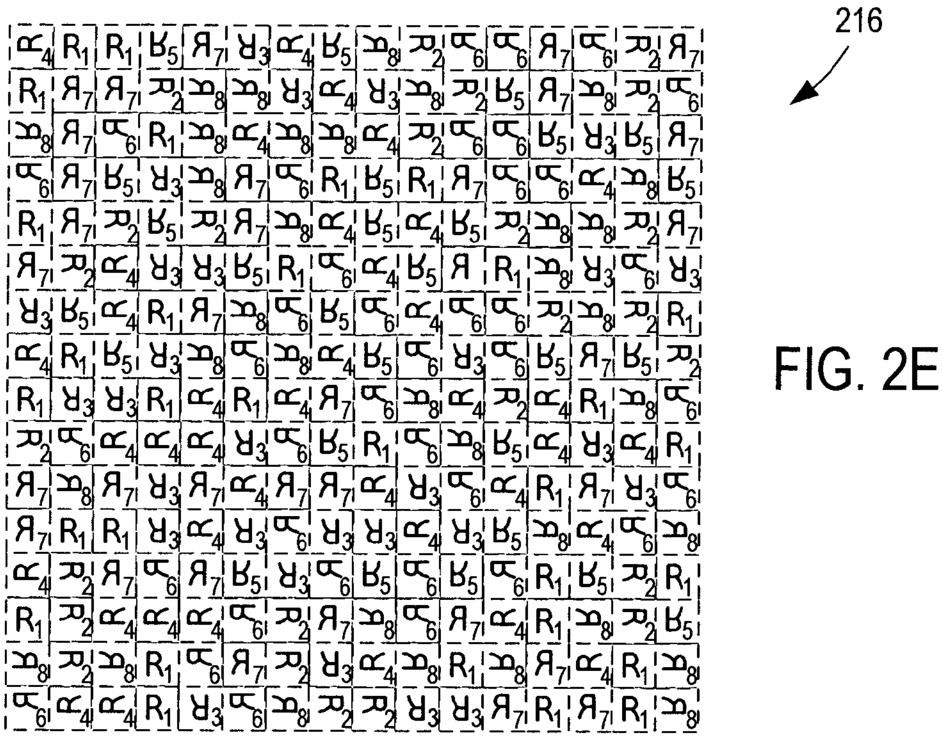
FIG. 2E depicts an exemplary arrangement of variously oriented "R" modules that may be used to form a textile repeat unit or motif.

Each arrangement of modules having various orientations will define a unique arrangement of design elements or shapes. By way of example, FIG. 2E illustrates a 16×16 array 216 of variously oriented modules 200, again illustrated using the letter "R" and the numeric position indicator for simplicity. The array includes a total of 256 modules having various orientations.

Figure 2F:
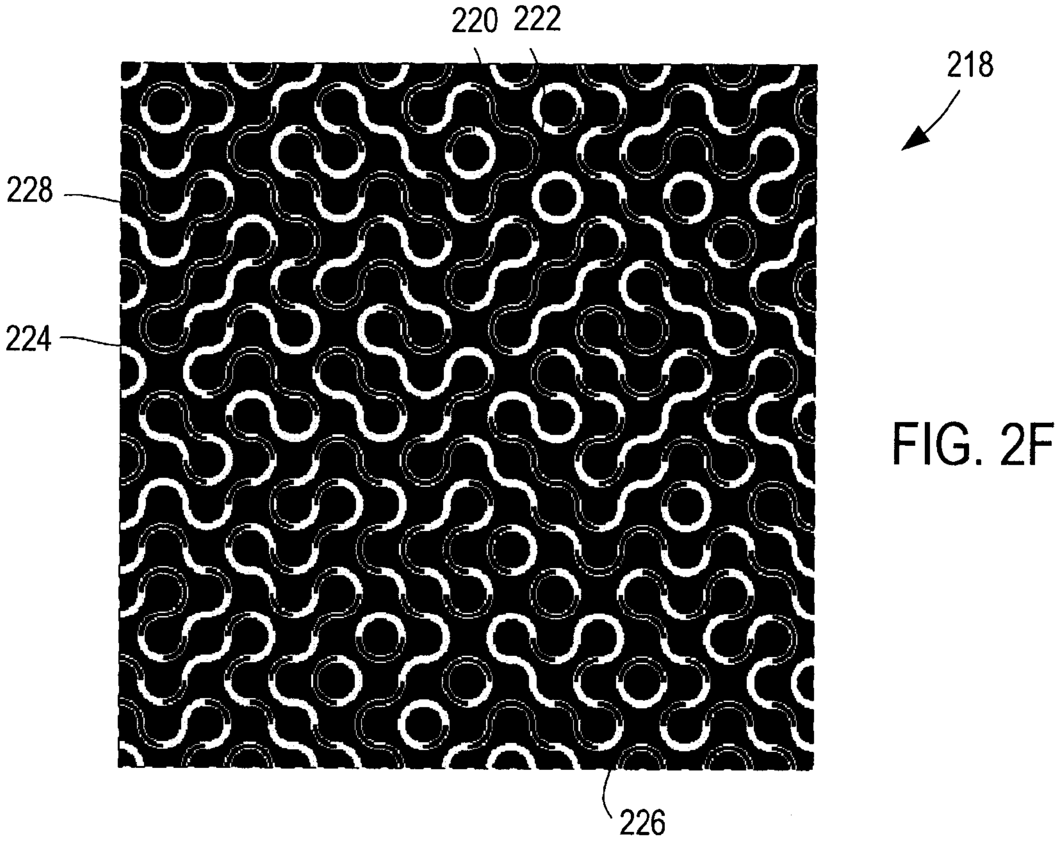
FIG. 2F depicts an exemplary textile repeat unit or motif formed by replacing the "R" modules of FIG. 2E with the module of FIG. 2A in same orientation as the "R" modules.

The generic "R" modules then may be replaced with the corresponding orientations of module 200 to form a textile motif or repeat unit 218, as shown in FIG. 2F. As shown in FIG. 2F, the motif comprises the design module repeated to form a unitary array of design modules, with the design modules of the unitary array of design modules having various orientations with respect to one another in fixed positions within the unitary array to define the motif 218. The unitary array of design modules (i.e., the motif 218) includes at least a first design module having a first orientation, and a second design module having a second orientation, where the design module having the first orientation is visually distinct from the design module having the second orientation, as illustrated schematically in FIG. 2F.

In this example, the motif 218 includes a plurality of arcs with aligned endpoints that form various new design elements, including circles 220, double circles 222, triple circles 224, and numerous other sinuous shapes, for example, shape 226, each of which is set against a field 228. Each design element is depicted as being completely white, completely black (with a white border), or some combination of both white and black (with a white border). However, other color configurations are contemplated. Notably, there are no "incomplete" or "open" shapes (i.e. ones with available endpoints), except along the periphery of the motif 218.

The motif 218 may then be repeated along a length and a width of a textile web (e.g., a continuous textile web), such that the textile web comprises at least a first occurrence of the motif and a second occurrence of the motif. Each occurrence or repeat of the motif along the length and/or width of the textile web comprises the unitary array of design modules of the motif 218, as shown schematically in FIG. 2F.

Figure 2G:
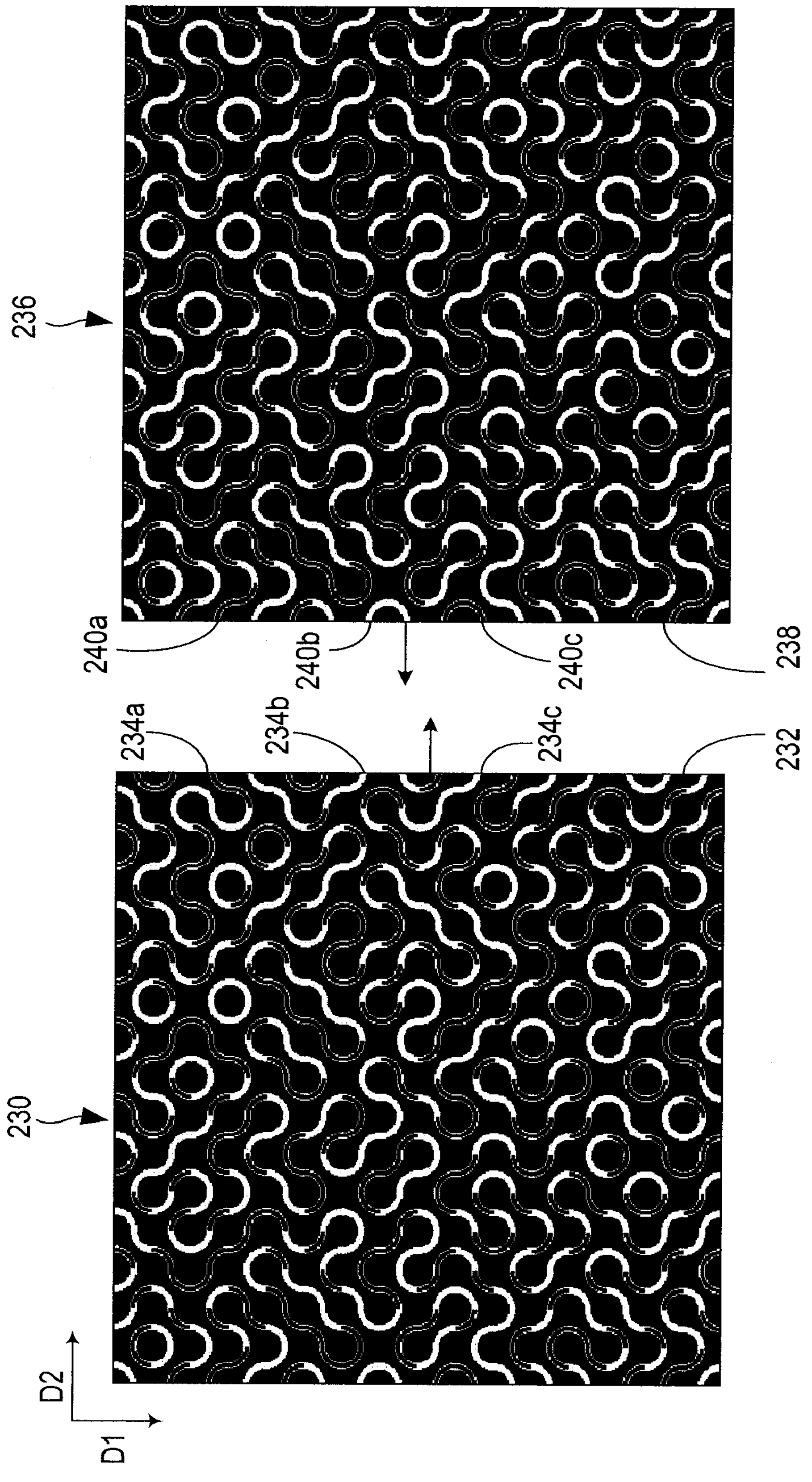
FIGS. 2G-2N illustrate a method of aligning textile pieces formed using the motif of FIG. 2F.
Figure 2H:
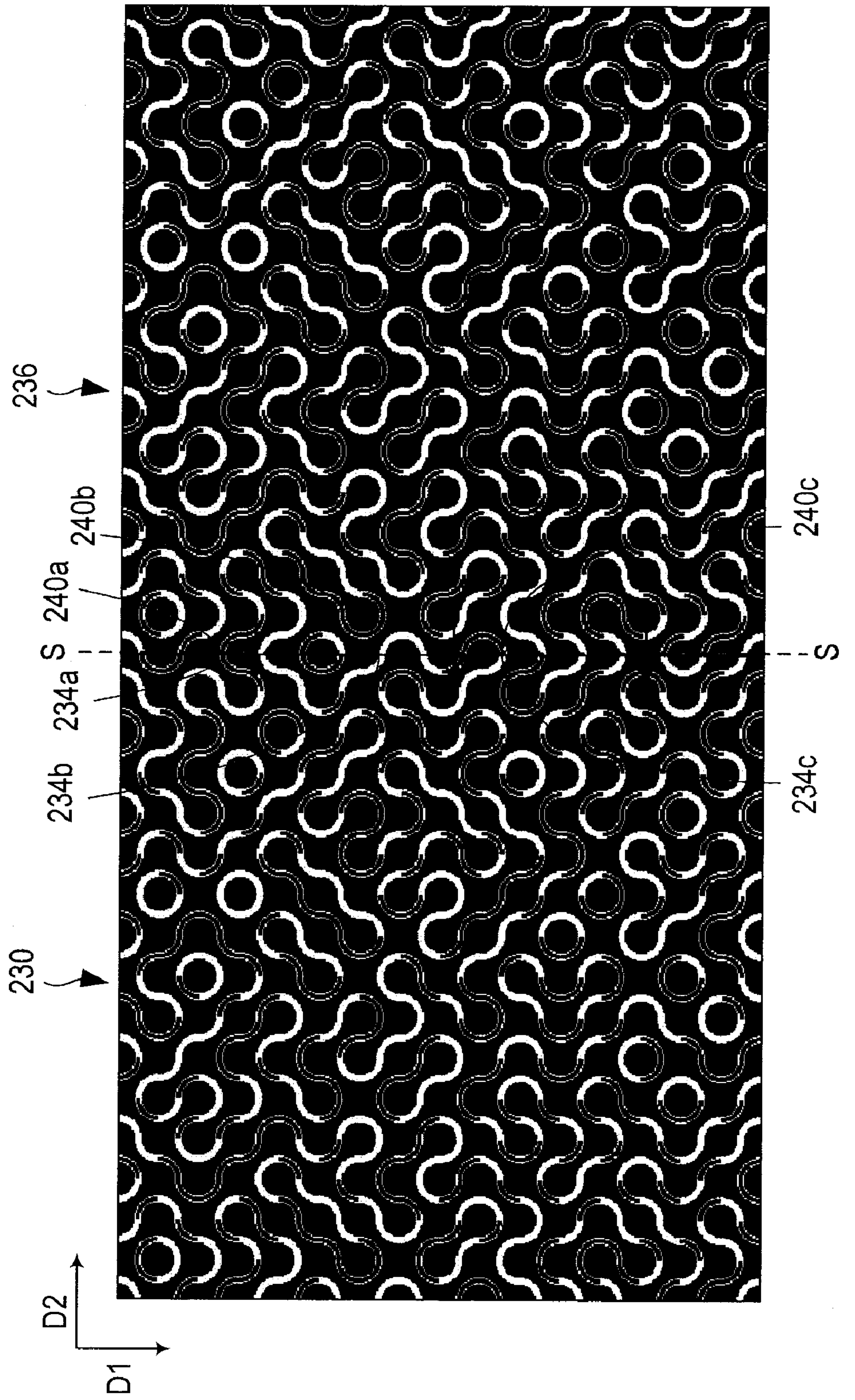
Figure 2I:
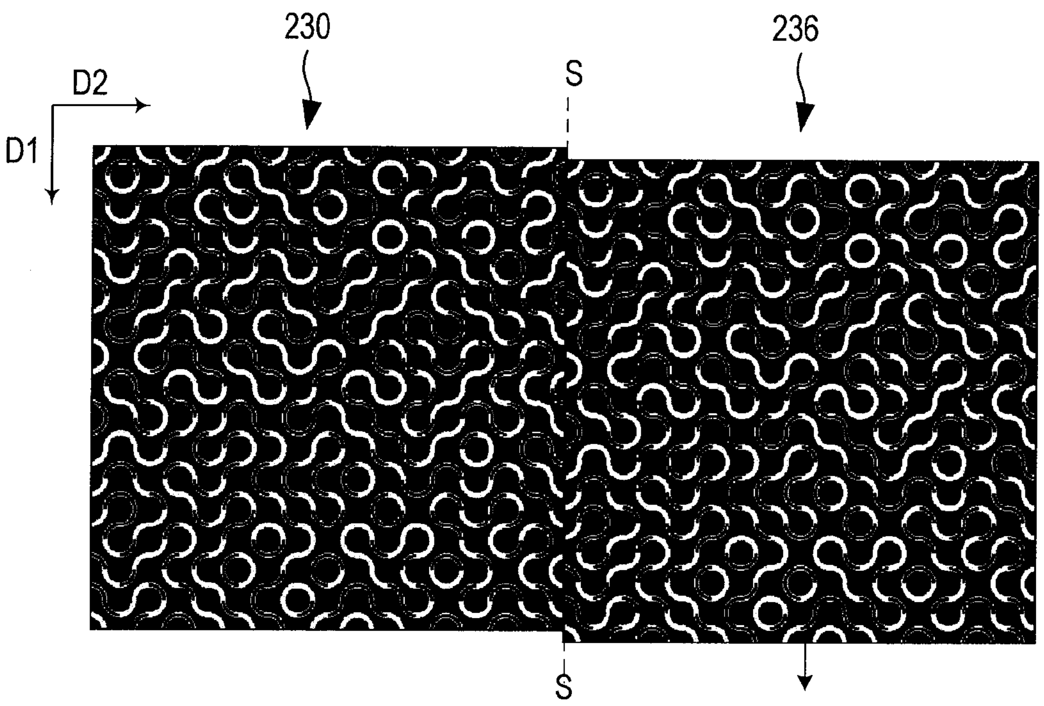
Figure 2J:
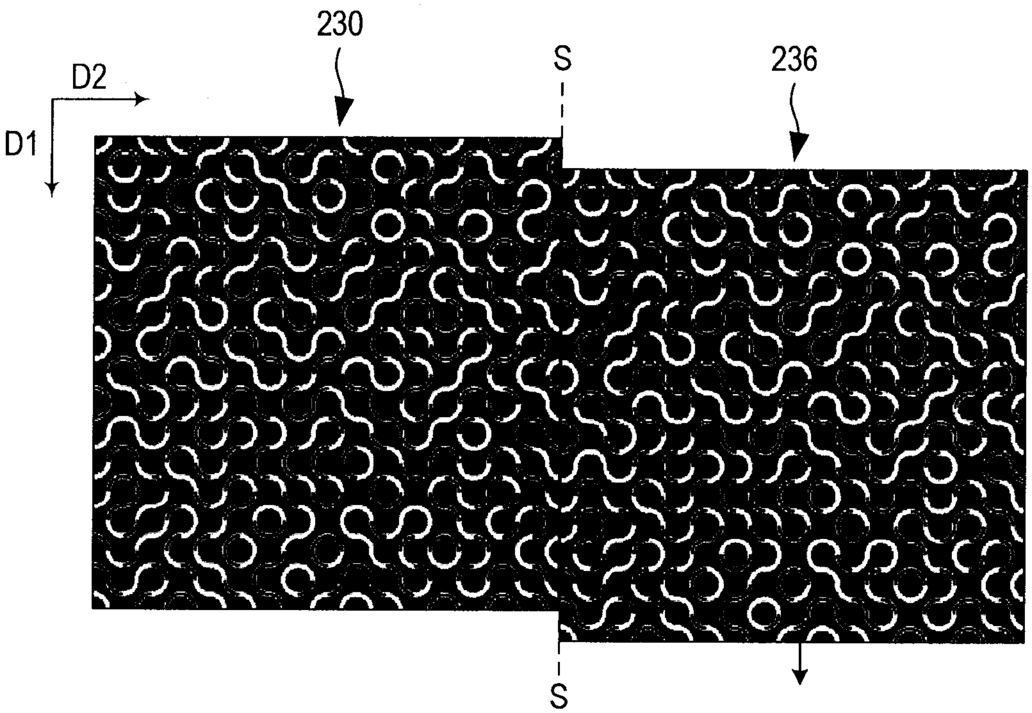
Figure 2K:
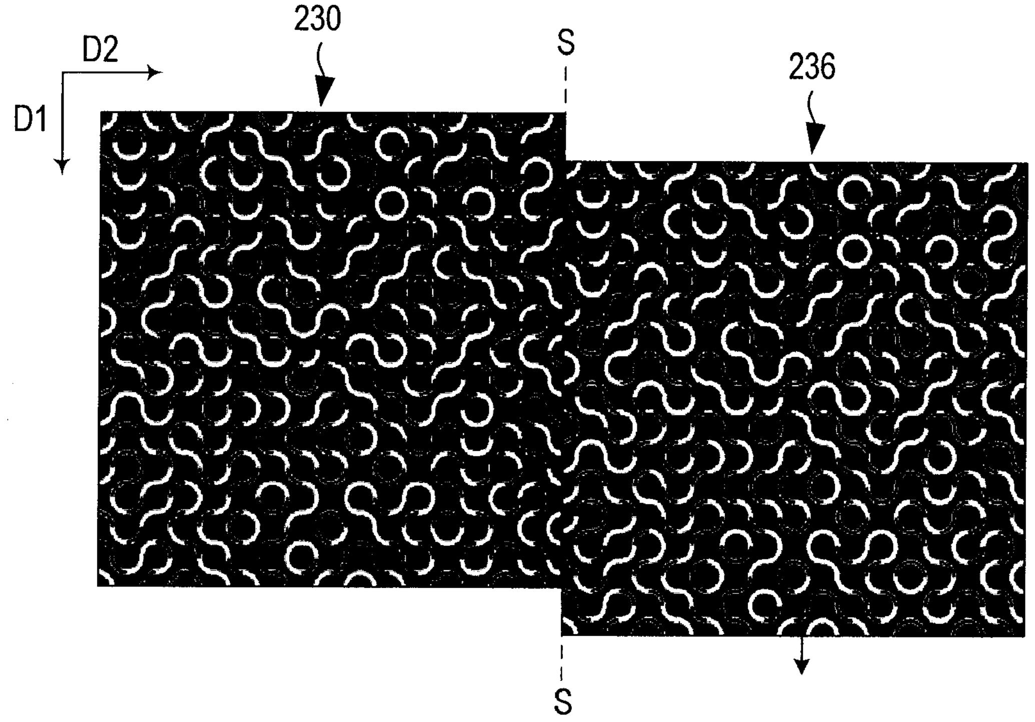
Figure 2L:
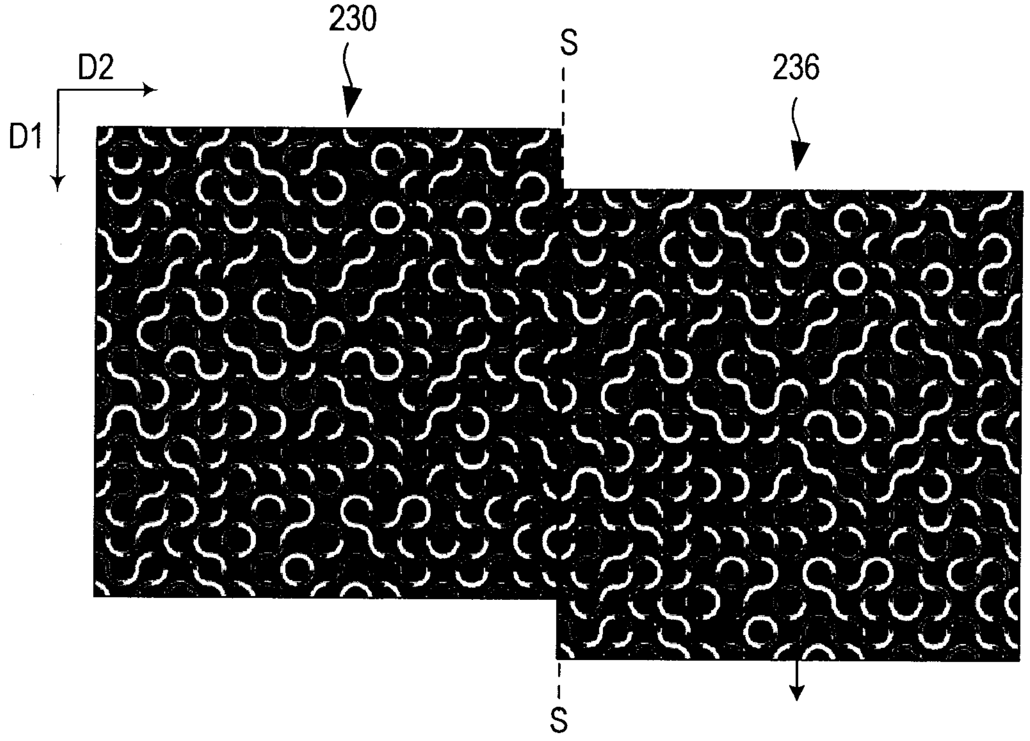
Figure 2M:
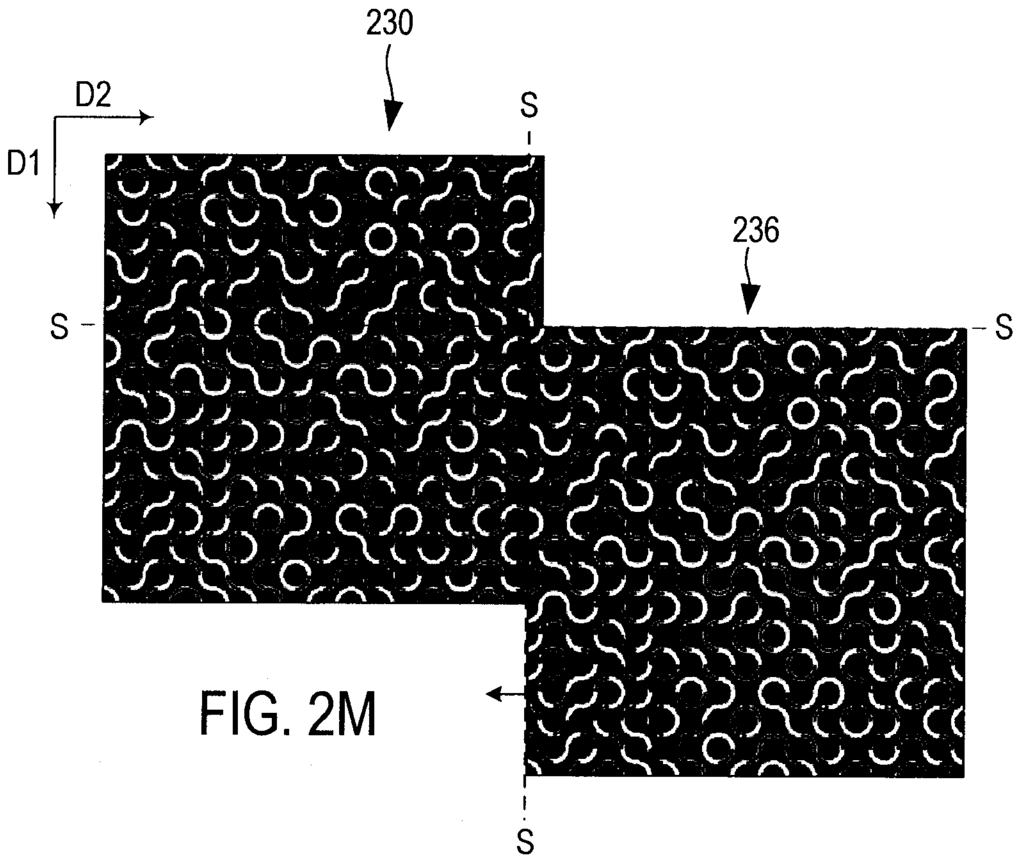
Figure 2N:
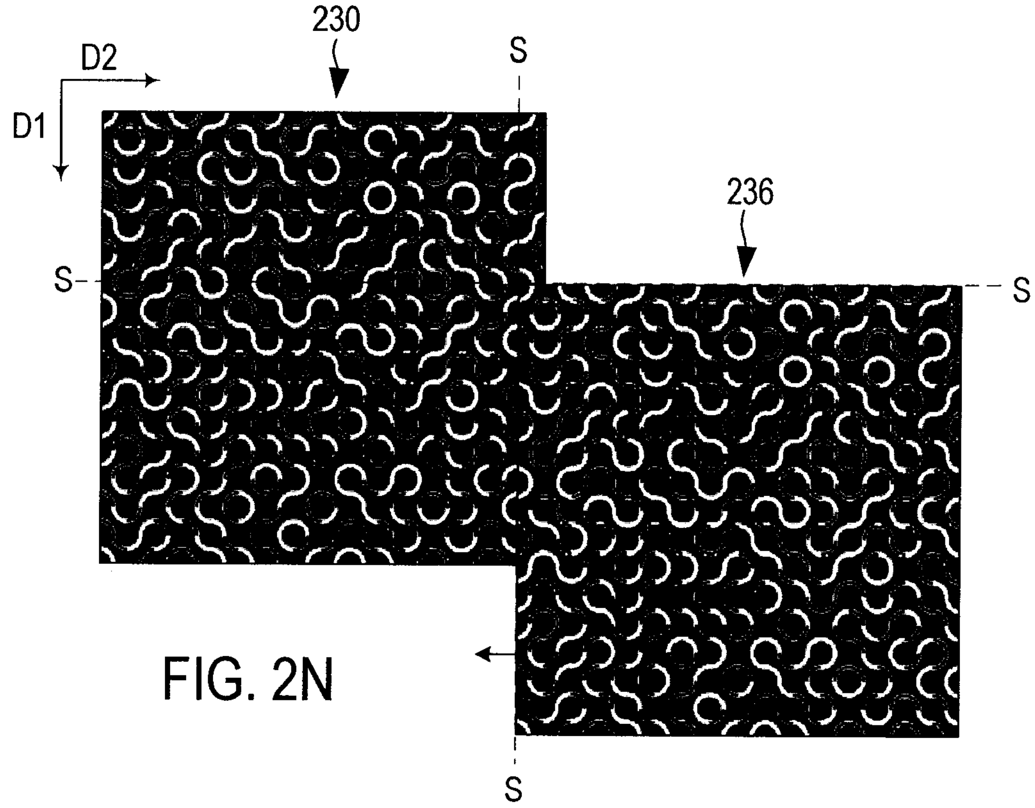
Figure 2O:
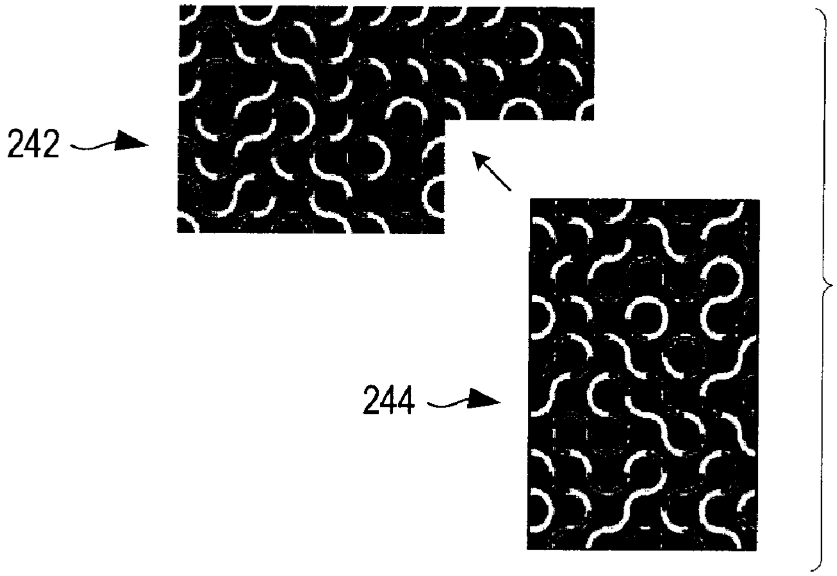
FIGS. 2O and 2P illustrate the alignment of two textile pieces.
Figure 2P:
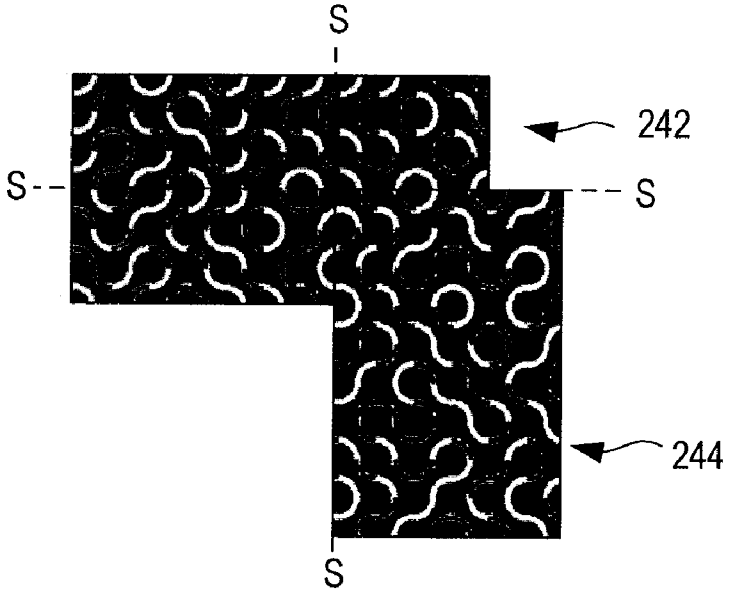
Figure 2Q:
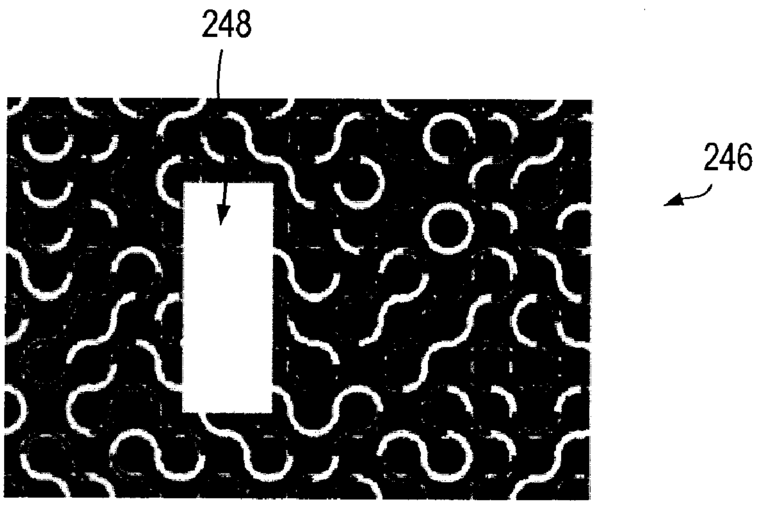
FIGS. 2Q-2Z illustrate the replacement of a textile piece.
Figures 2R, 2S, 2T:
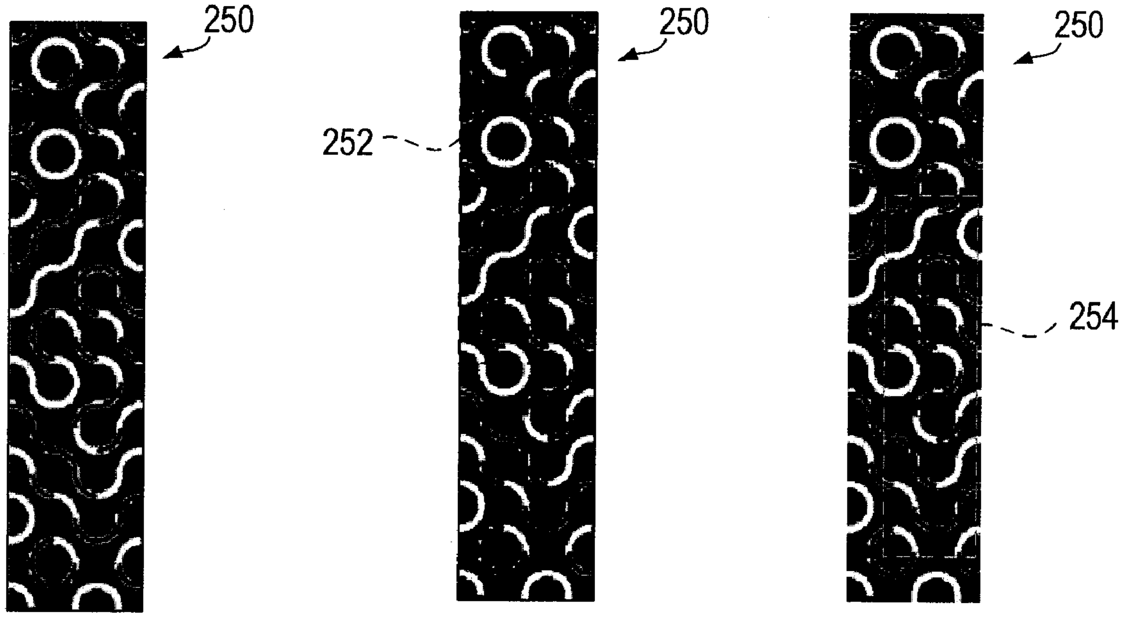
Figure 2U:
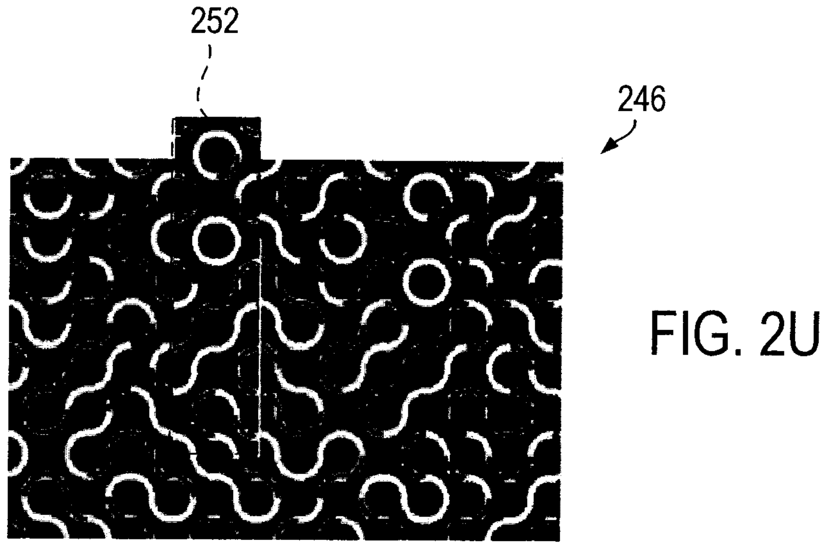
Figure 2V:
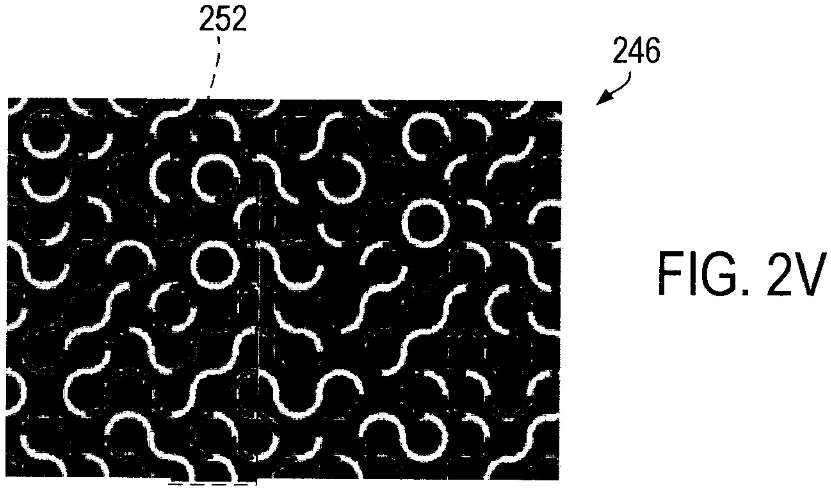
Figure 2W:
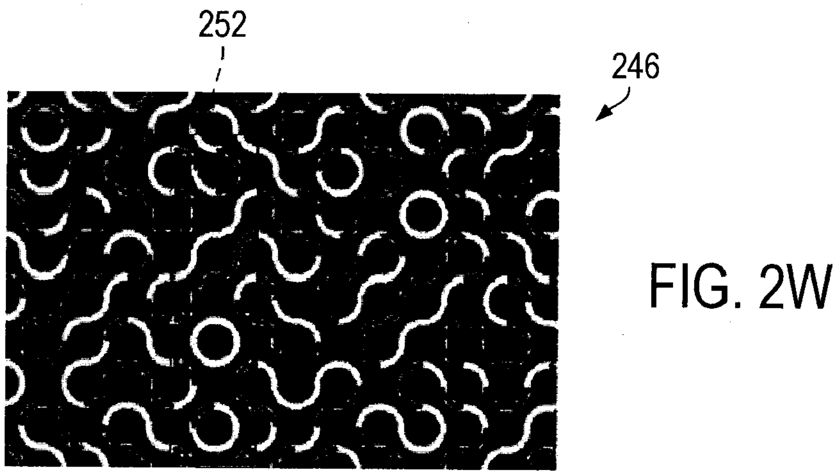
Figure 2X:
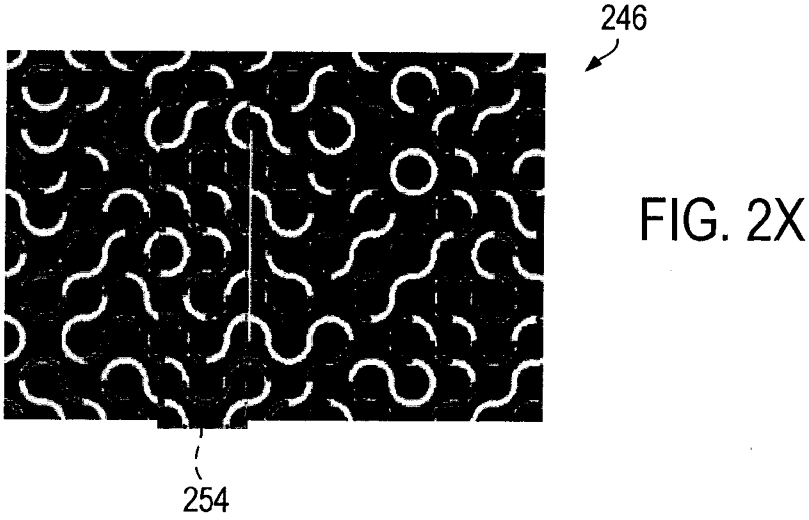
Figure 2Y:
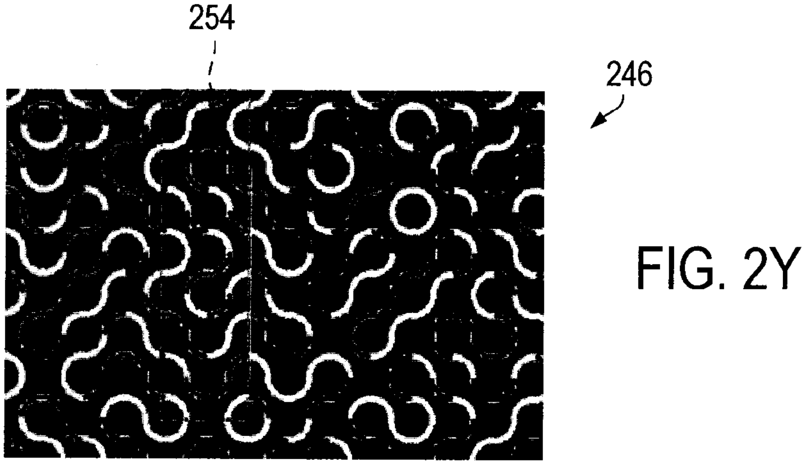
Figure 2Z:
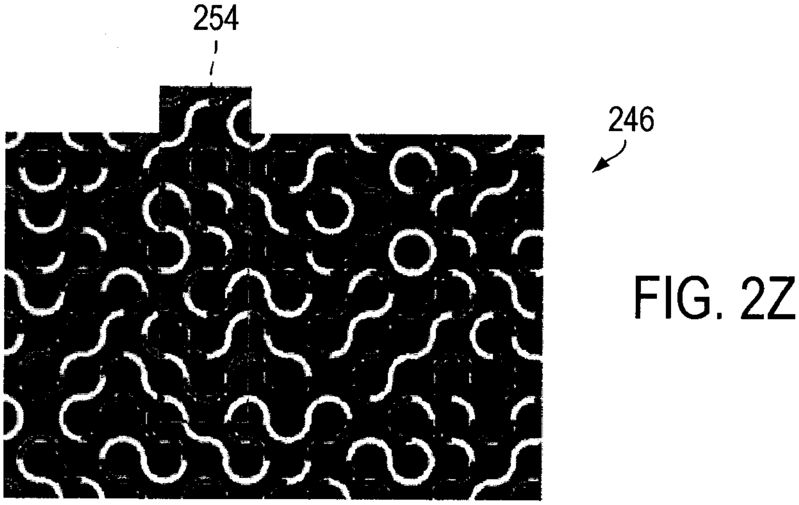

FIGS. 2G-2Z illustrate how the patterning technique of the invention facilitates alignment of two or more textile pieces. In this and other examples, it is noted that some of the textile pieces depicted in the figures also may correspond to a single repeat unit or motif. However, it will be understood that the repeat unit is continuously repeated over the length and width of the textile web, and that the alignment of textile pieces illustrated herein may be achieved using any textile piece patterned according to the invention, regardless of where the particular pieces are taken from the textile web.

Viewing FIG. 2G, a first textile piece 230, for example, a first piece of fabric or carpet, includes a plurality of peripheral edges including edge 232, which extends generally in a first direction D1. The endpoints of one or more arcs, for example, endpoints 234*a*, 234*b*, 234*c*, that form the various elements of the motif, abut at least one of the edges, for example, edge 232. Likewise, a second textile piece 236, for example, a second piece of fabric or carpet, includes a plurality of peripheral edges including edge 238, which extends generally in the first direction D1. The endpoints of one or more arcs, for example, arcs 240*a*, 240*b*, 240*c*, abut at least one of the edges, for example, edge 238.

The basic lateral alignment of the textile pieces 230, 236 is illustrated in FIGS. 2G and 2H. As the pieces 230, 236 are brought towards one another in a direction D2, it is evident that arc ends 234*a*, 234*b*, 234*c* on the first piece 230 will align readily with arc ends 240*a*, 240*b*, 240*c* on the second piece 236. In doing so, a seemingly random pattern of shapes may be formed, some of which are adjoined across a seam S (shown sometimes herein as a dashed line extending beyond the dimensions of the textile pieces when needed for clarity), as shown in FIG. 2H. Although the alignment of textile pieces formed a plurality of new shapes or design elements across the seam, the patterning technique of the invention creates an overall impression of continuity. As a result, it is difficult to discern the boundary both between adjacent motifs and textile pieces.

In many cases, however, this simple side-by-side alignment of similar textile pieces is not practicable. For example, where the shape of an item dictates different size pieces (for example, the shape of a garment or room), the pieces must be cut and therefore aligned differently. Additionally, where pieces are cut from a roll of the textile, the pieces rarely are cut to include exactly one repeat unit of the pattern. Further, where a portion of the textile piece is replaced due to damage or wear, which often occurs with carpet, it is unlikely that the replacement piece will consist precisely of a textile repeat unit.

FIGS. 2I-2N illustrate how the patterning technique of the invention facilitates alternate alignments between pieces. Starting with the alignment illustrated in FIG. 2H, the second piece 236 may be moved in the first direction D1 relative to the first piece 230, as shown in FIG. 2I. Initially, the arcs are misaligned along the seam S. However, because of the edge symmetry of each module, further movement of the second piece 236 quickly results in alignment of the arcs to form a seemingly random pattern of interconnected arcs, as shown in FIG. 2J. It is noted that this alignment results in a different pattern being formed along the seam S than that illustrated in FIG. 2H. Still, the visually ambiguous nature of the overall design formed by the abutted pieces 230, 236 is aesthetically pleasing.

FIGS. 2K-2N illustrate further movement of the second piece 236 in the second direction D2 with alignment occurring, for example, as shown in FIGS. 2J and 2L. Each alignment results in a different overall design, each being visually pleasing. It will be understood that numerous other alignments are contemplated. In this example, the pieces will align at least once per module, or in this case, at least 16 times per motif.

Likewise, as shown in FIGS. 2M-2N, the patterning technique of the invention facilitates the alignment of the textile pieces 230, 236 when the second piece 236 is moved in the second direction D2. Beginning with the alignment illustrated in FIG. 2L and viewing FIG. 2M, the available arcs on the second piece 236 initially are not in overlapping alignment with the pattern of arcs on the first piece 230. However, alignment is achieved readily by moving the second piece 236 further in the second direction D2, as depicted in FIG. 2N.

As another example, FIGS. 2O and 2P illustrate the alignment of the design elements on two irregularly shaped pieces 242, 244, each including a portion of at least one textile repeat unit.

Thus, numerous possible alignments between two or more textile pieces may be made by merely adjusting one or more of the pieces until the theoretical boundaries of adjacent modules are brought into alignment. As a result, the amount of waste generated in aligning the design on adjacent pieces is minimized. For example, where the module is about 4 inches by 4 inches, the textile pieces need only be adjusted up to about 4 inches to bring the respective designs into alignment. In sharp contrast, typical patterns often require a significantly larger portion to be removed, and often wasted, to align the textile design along a seam.

The patterning technique also facilitates replacement of a worn or damaged portion of a textile. For example, carpets and upholstery often are soiled and are not capable of being cleaned. Typically, replacement of a section or piece of the carpet or fabric requires the use of excess carpet or fabric to achieve proper alignment of the pattern with the existing installation. However, the patterning technique affords greater flexibility in alignment and better potential for use of smaller pieces or scrap materials, as will be discussed in connection with FIGS. 2Q-2Z.

Turning to FIGS. 2Q and 2R, a portion (not shown) of a textile has been removed from an installation 246, thereby forming an opening or void 248 for receiving a replacement piece. A scrap 250 (FIG. 2R) of the textile is available for use in replacing the damaged section of the installed textile. The scrap may be larger than the opening, as shown in FIG. 2R, or may be smaller if desired. In the latter case, multiple scraps likely will be needed to complete the installation.

With the various patterns formed according to the patterning technique, numerous replacement pieces may be cut from the scrap piece. As mentioned above, alignment of the design occurs at each module. Thus, it would be prudent to measure the module and size the replacement piece to be slightly larger than the actual size of the void to be filled, for example, at least one module length and width larger than the size of the void.

FIGS. 2S and 2T illustrate exemplary replacement pieces 252, 254 (defined by dashed lines) that may be removed from the textile scrap 250. The replacement piece 252, 254 may be installed in numerous ways, examples of which are shown respectively in FIGS. 2U-W and FIGS. 2X-2Z, in which the edges of the respective replacement piece 252, 254 are shown in dashed lines. In either example, the replacement piece may be adjusted as necessary to achieve the best fit and alignment with the existing design. Any excess textile may be removed from the replacement piece before permanently installing it in the void.

Example 3

Figure 3A:
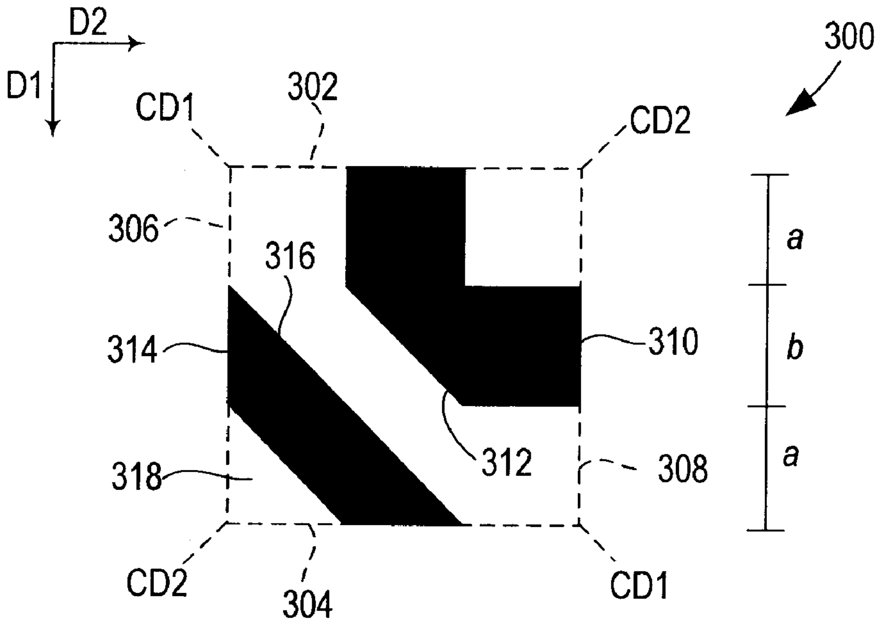
FIG. 3A depicts another exemplary module that may be used to form a textile pattern.

FIG. 3A illustrates another exemplary module 300 that may be used to form a textile pattern. The module 300 is depicted as having a substantially square shape defined by theoretical edges 302, 304, 306, 308, each of which is shown as a dashed line. However, the module 300 does not include a defined border, as will be evident from the remaining figures.

The module 300 includes a somewhat L-shaped element 310 extending between edges 302, 308, with the endpoints of the element 310 being substantially centered along the length of respective edges 302, 308. An innermost edge 312 of the element 310 lies substantially along a first diagonal centerline CD1 of the module 300. The module 300 also includes a somewhat trapezoidal element 314 that extends between edges 304, 306. The endpoints of the trapezoidal element 314 are substantially centered along the length of respective edges 304, 306. An innermost edge 316 of element 314 is substantially parallel to the innermost edge 312 of element 310. The remainder of the module 300 comprises a field 318, shown in white. The module 300 is substantially symmetrical across a second diagonal centerline CD2 and asymmetrical across the various other centerlines, such that the module 300 has a degree of symmetry of 1.

Each of edges 302, 304, 306, 308 can be divided into segments a, b having a substantially equal length, as illustrated with respect to edge 308. It will be evident from FIG. 3A that the center segment b of each edge 302, 304, 306, 308 has a first hue, in this example, black, defined by elements 310, 314, while the end segments a have a second hue, in this example, white, defined by the field 318. Each edge 302, 304, 306, 308 can be characterized as having bidirectional symmetry, such that any edge will form a perfect alignment with any other edge.

Figure 3B:
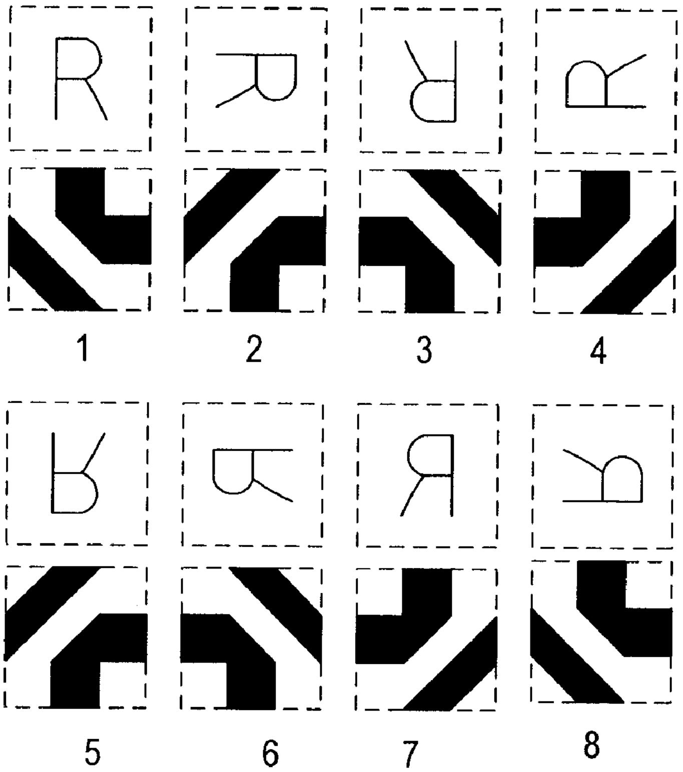
FIG. 3B depicts various orientations of the module of FIG. 3A.

Various orientations of the module 300 are illustrated in FIG. 3B, in which the module again is illustrated with a theoretical peripheral boundary (shown with dashed lines). The oriented modules may be prepared in the manner described in connection with FIG. 1B. For clarity and ease of illustration, the corresponding "R" module for each orientation is provided above each orientation. In this example, orientation 1 appears the same as orientation 8, orientation 2 appears the same as orientation 5, orientation 3 appears the same as orientation 6, and orientation 4 appears the same as orientation 7. Thus, there are four distinct orientations.

Figure 3C:
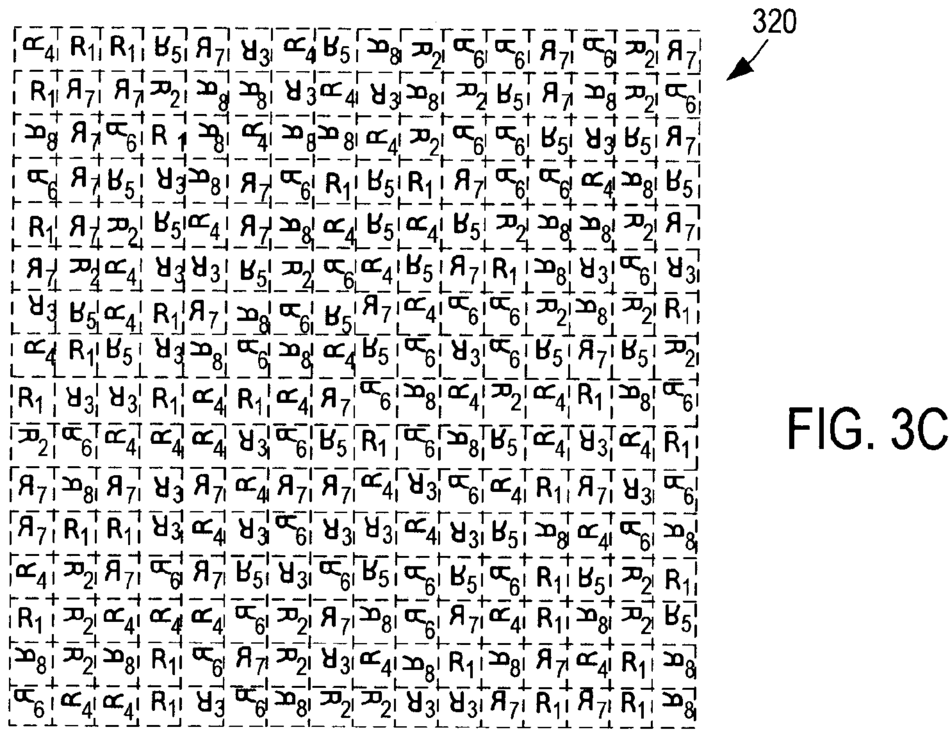
FIG. 3C depicts an exemplary arrangement of variously oriented "R" modules that may be used to form a motif.
Figure 3D:
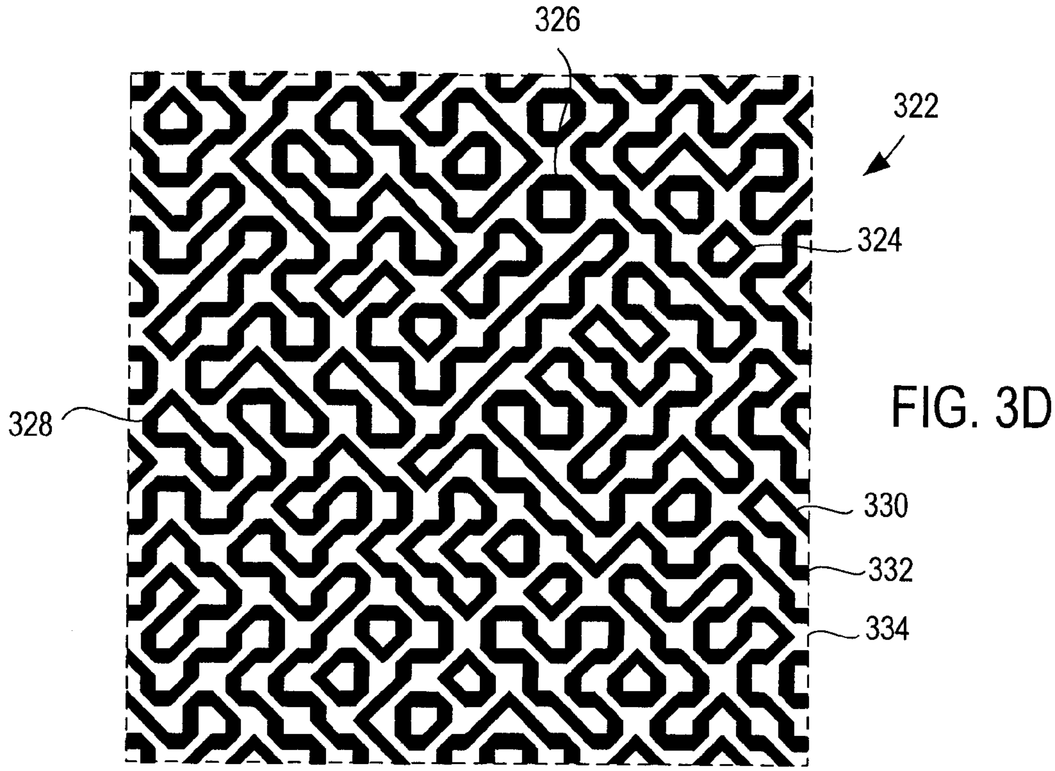
FIG. 3D depicts an exemplary motif formed by replacing each "R" module of FIG. 3C with the module of FIG. 3A oriented in the same manner as the respective "R" module.

FIG. 3C illustrates an exemplary 16×16 array 320 of "R" modules. With the "R" module replaced by module 300, the resulting motif 322 resembles a maze, as shown in FIG. 3D. The design comprises a plurality of closed and open shapes, for example, substantially hexagonal closed shape 324, substantially octagonal closed shape 326, and irregular closed shape 328. Each of the open shapes, for example, shape 330, includes at least one available endpoint, for example, endpoint 332, along a peripheral edge 334 of the motif 322.

Figure 3E:
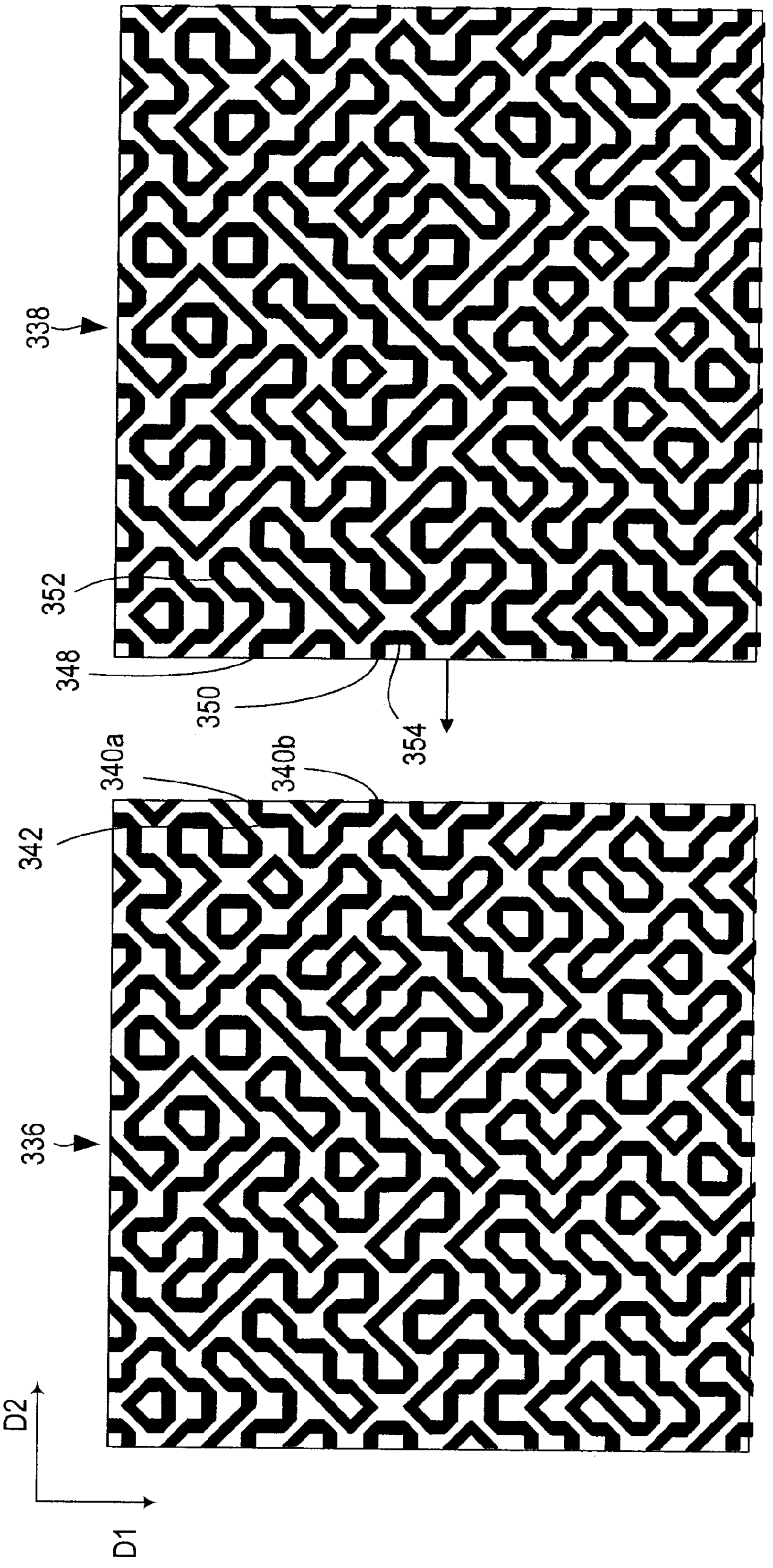
FIGS. 3E-3H illustrate the alignment of textile pieces formed using the motif of FIG. 3D.
Figure 3F:
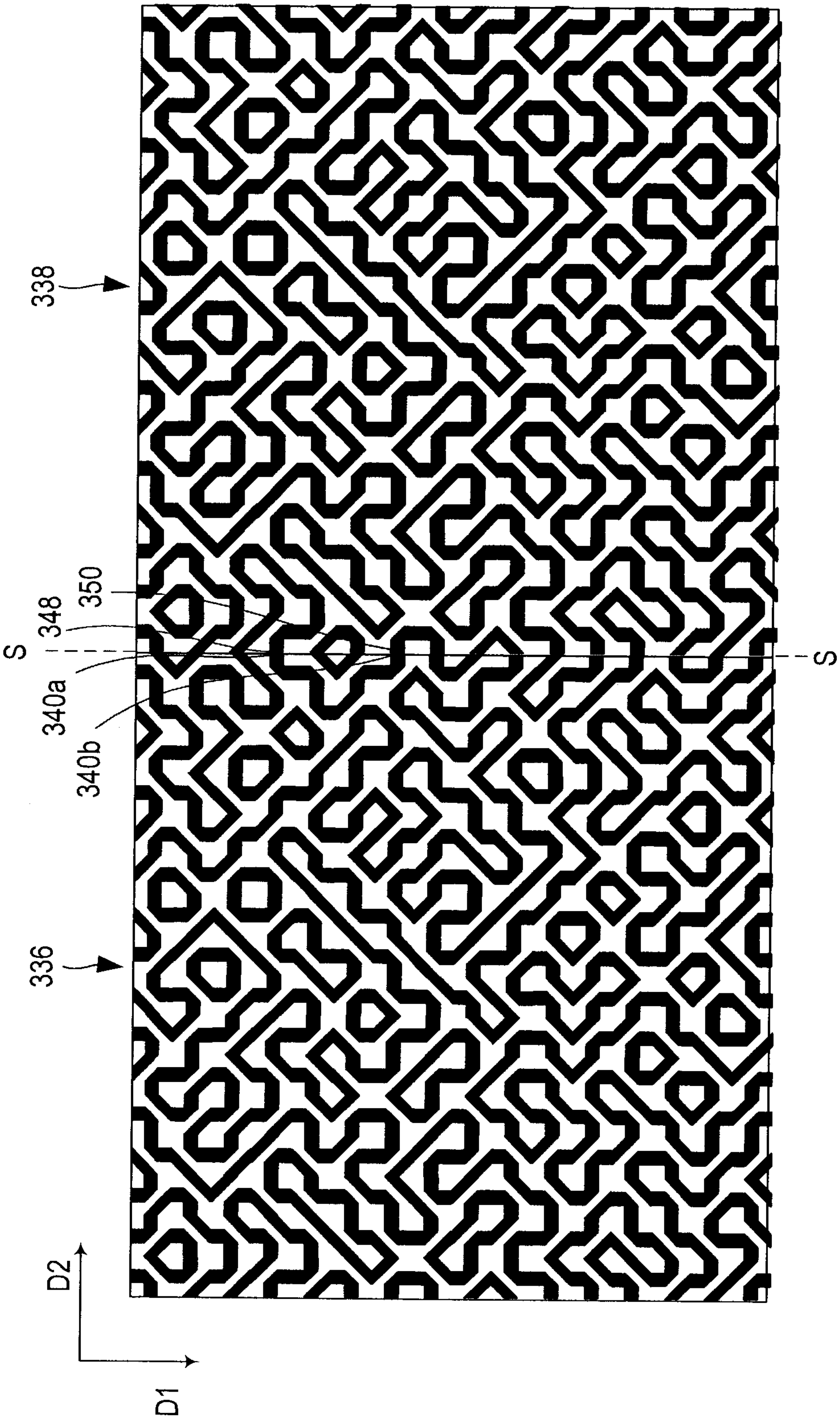

FIGS. 3E-3H illustrate how the patterning technique facilitates alignment of two or more textile pieces 336, 338. As shown in FIGS. 3E and 3F, endpoints *340a*, *340b* of shape 342 on textile piece 336 readily align with endpoints 348, 350 of respective shapes 352, 354 on textile piece 338 to form a seemingly random pattern of shapes, some of which are formed across a seam S.

Figure 3G:
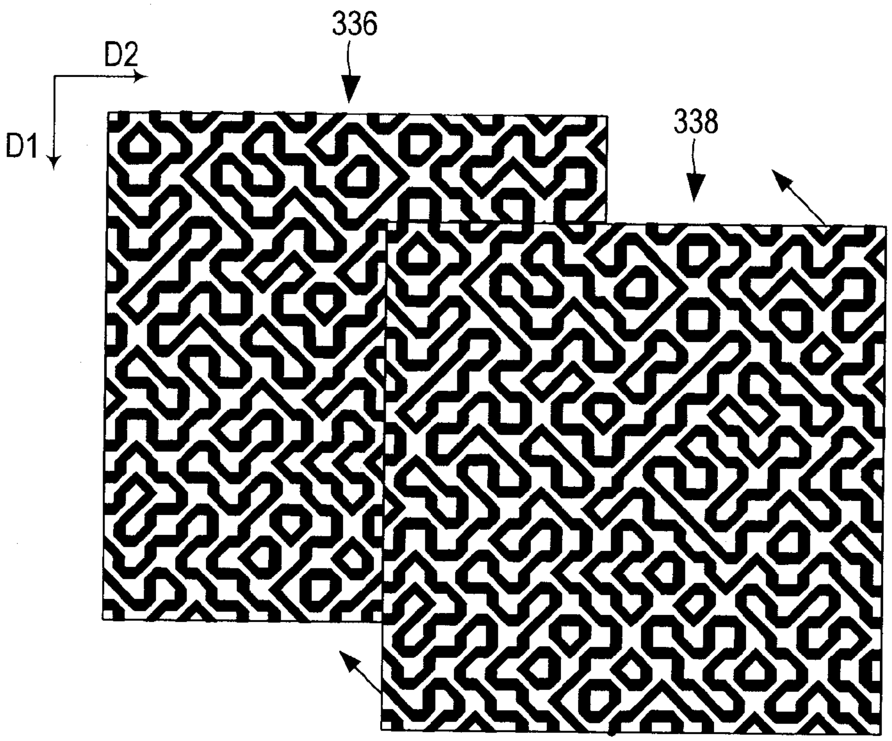
Figure 3H:
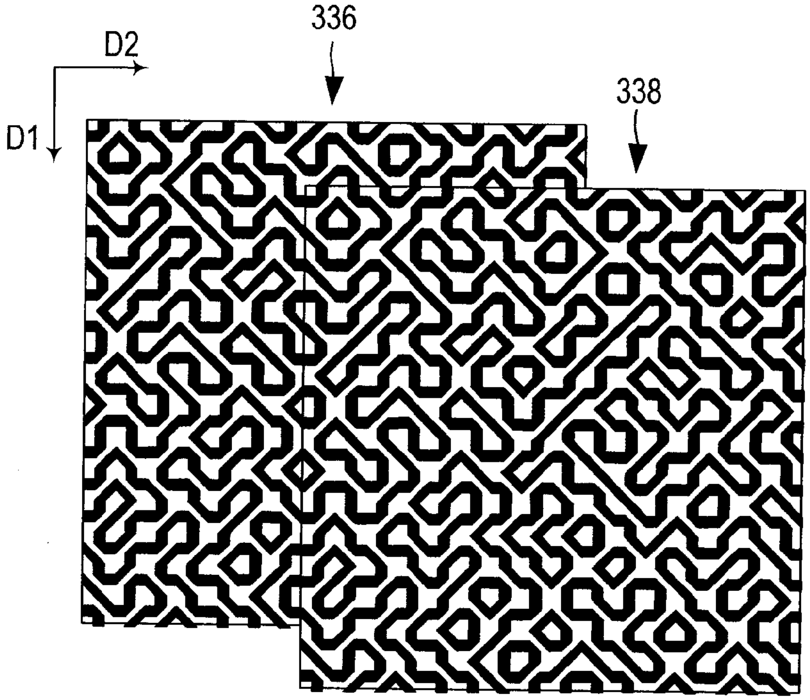

Numerous other alignments may be made in both directions D1 and D2. The pieces will align at least once per module in each direction, or in this case, at least 16 times per motif in each direction. For example, FIG. 3G depicts an example of lateral and vertical misalignment. As textile piece 338 is moved in the direction of the arrows, the various shapes in both textile pieces 336, 338 readily align, as shown in FIG. 3H, to form a seemingly random pattern of interconnected shapes. Although this alignment results in a different design being formed along and across seams than that illustrated in FIG. 3F, the overall pattern formed by the abutted pieces 336, 338 appears to be consistent with the remainder of the textile pattern.

Example 4

Figure 4A:
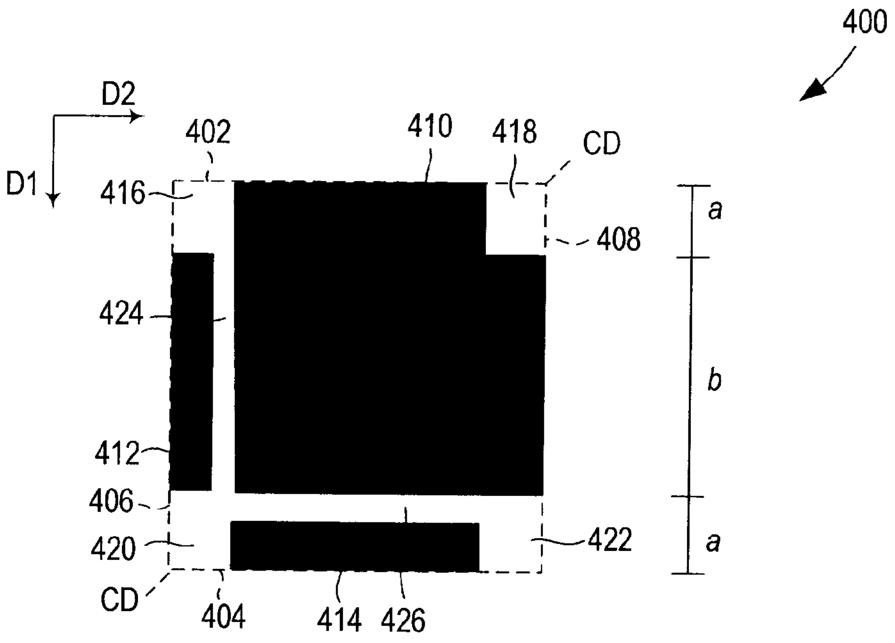
FIG. 4A depicts yet another exemplary module that may be used to form a textile pattern.

FIG. 4A illustrates yet another exemplary module 400 that may be used to form a textile pattern. As with the various other examples, the module 400 is depicted as having a substantially square shape defined by theoretical edges 402, 404, 406, 408, each of which is shown as a dashed line.

The module 400 includes a plurality of elements 410, 412, 414 (shown in black) arranged between a plurality of substantially square corner elements 416, 418, 420, 422 (shown in white). Elements 410, 412 are spaced apart by a bar 424 (shown in white) extending in a first direction D1 between corner elements 416, 420, and elements 410, 414 are spaced apart by a bar 426 extending in a second direction D2 between corner elements 420, 422.

Element 410 abuts and/or at least partially defines edges 402, 408 and generally resembles a square having a notched corner defined by corner element 418. Element 412 is substantially rectangular in shape and abuts and/or at least partially defines edge 406. Element 414 also is substantially rectangular in shape and abuts and/or at least partially defines edge 404. The module is substantially symmetrical along a diagonal centerline CD and asymmetrical across the remaining centerlines (not labeled), such that the module 400 has an overall degree of symmetry of 1.

Each edge 402, 404, 406, 408 can be divided into segments a, b, as illustrated with respect to edge 408, with respective segments a having a substantially equal length and respective segments b having a substantially equal length, such that the arrangement of segment lengths is symmetrical along each edge 402, 404, 406, 408. The center segment b of each edge 402, 404, 406, 408 has a first hue (black) defined by elements 410, 412, 414, while the end segments a of each edge 402, 404, 406, 408 have a second hue (white) defined by the corner elements 416, 418, 420, 422. Each edge 402, 404, 406, 408 can be characterized as having bidirectional symmetry, such that any edge will form a perfect alignment with any other edge.

Figure 4B:
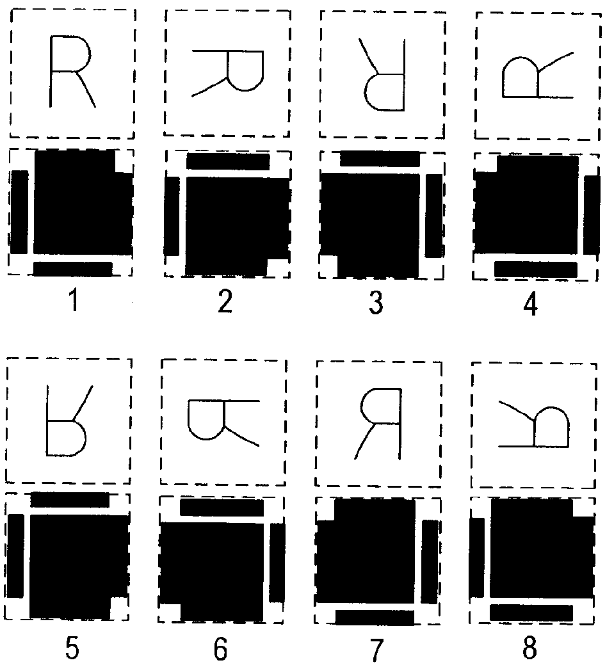
FIG. 4B depicts various orientations of the module of FIG. 4A.

Various orientations of the module 400 are illustrated in FIG. 4B with the corresponding "R" module for each orientation. Orientation 1 appears the same as orientation 8, orientation 2 appears the same as orientation 5, orientation 3 appears the same as orientation 6, and orientation 4 appears the same as orientation 7. Thus, there are four distinct orientations.

Figure 4C:
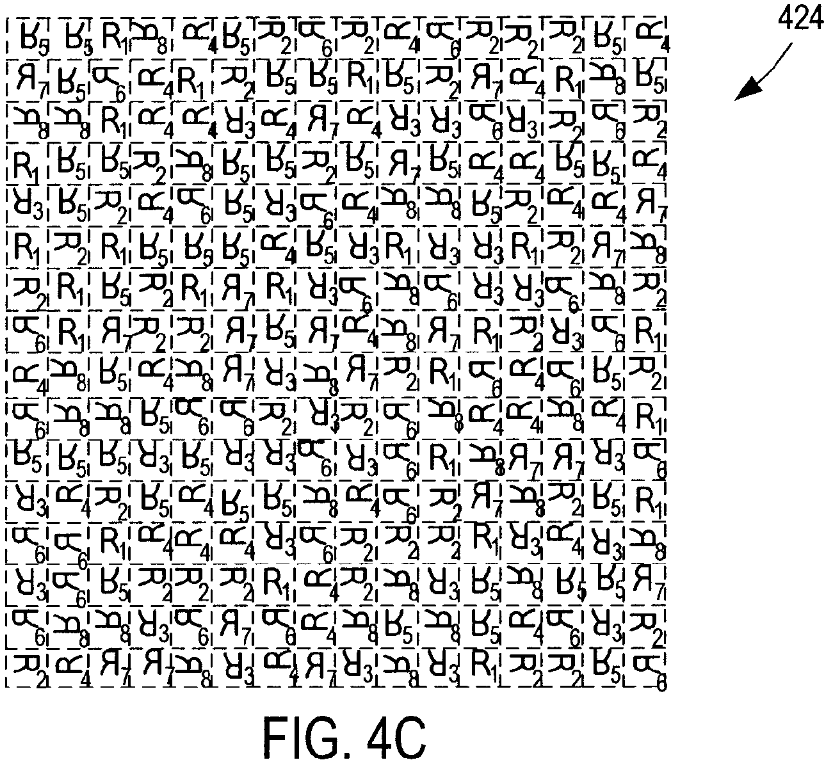
FIG. 4C depicts an exemplary arrangement of variously oriented "R" modules that may be used to form a motif.
Figure 4D:
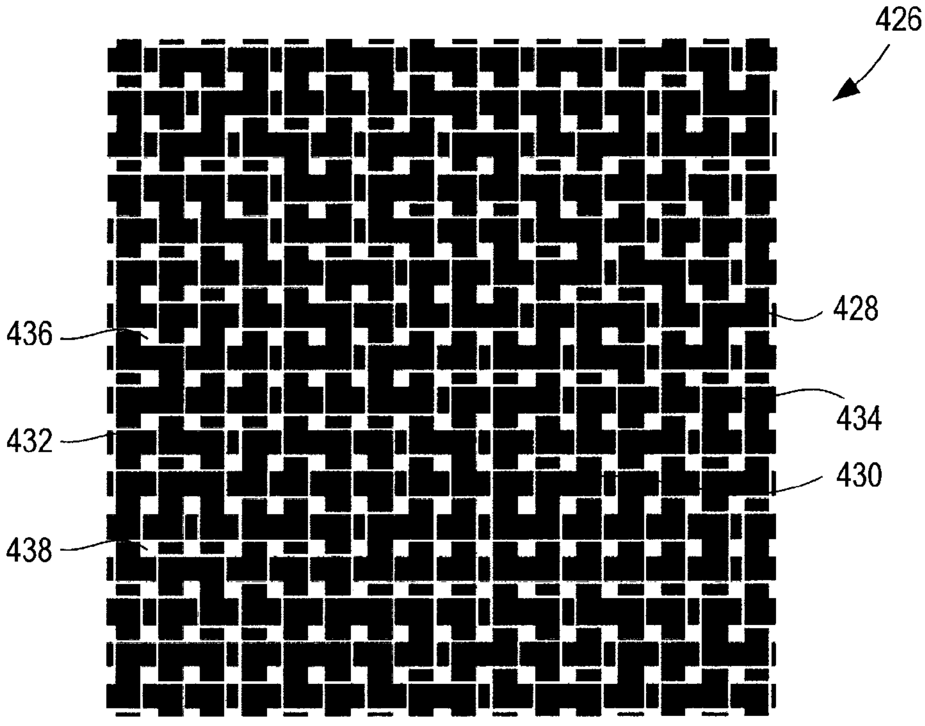
FIG. 4D depicts an exemplary motif formed by replacing the "R" modules of FIG. 4C with the modules of FIG. 4A oriented in the same manner as the "R" modules.

FIG. 4C illustrates an exemplary 16×16 array 424 of "R" modules. The "R" module may be replaced by module 400 to form a motif 426 that resembles a plurality of black overlapping zigzags, for example, zigzags 428, 430, separated by a plurality of white interconnected bars and squares, for example, bars 432, 434 and squares 436, 438, as shown in FIG. 4D.

Figure 4E:
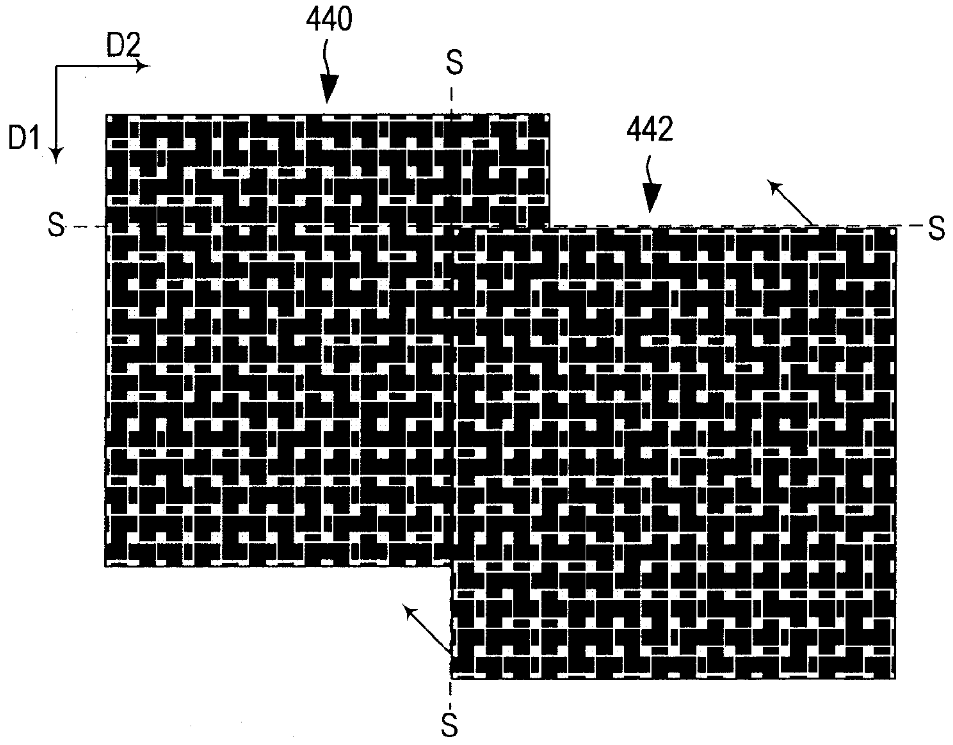
FIGS. 4E and 4F illustrate the alignment of textile pieces formed using the motif of FIG. 4D.
Figure 4F:
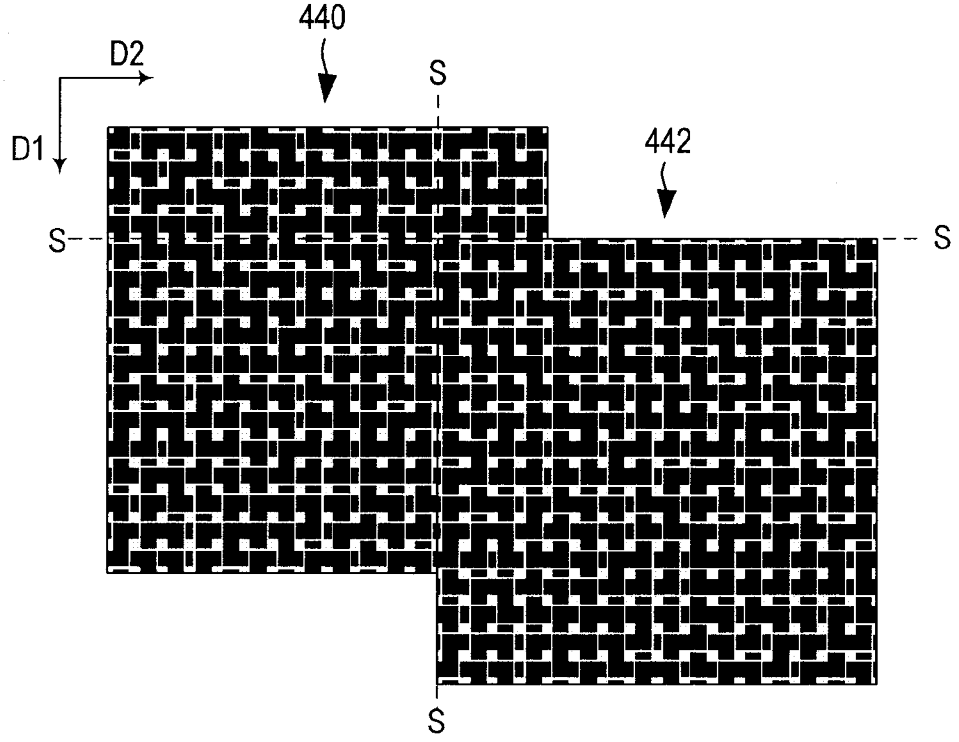

FIGS. 4E and 4F illustrate how the patterning technique facilitates alignment of textile pieces 440, 442, with FIG. 4E illustrating a misalignment of the designs on the respective pieces 440, 442 and FIG. 4F depicting an alignment of the designs on the respective pieces 440, 442. The overall design appears to be continuous, despite the presence of new elements created across the seams S.

Example 5

Figure 5A:
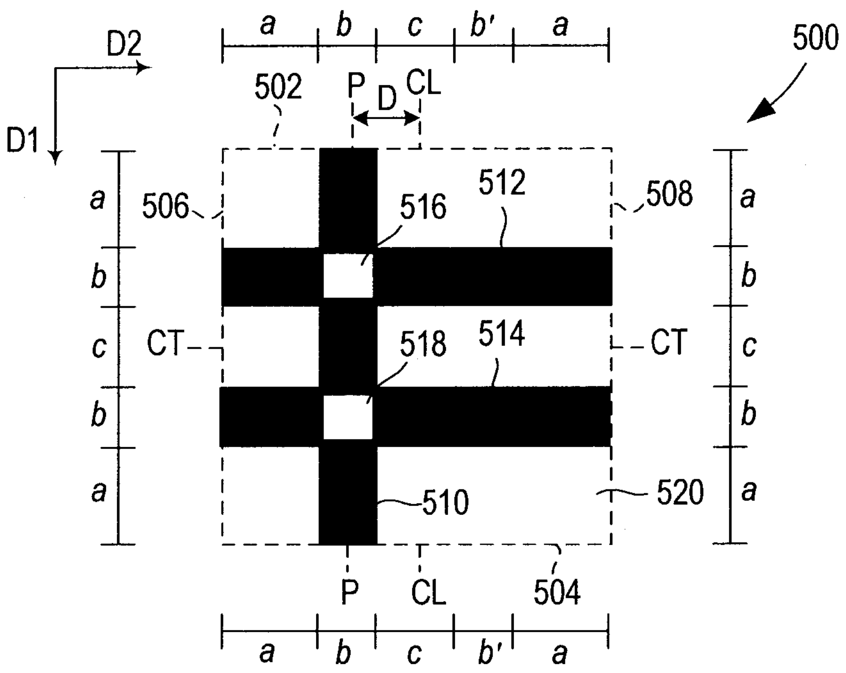
FIG. 5A depicts still another exemplary module that may be used to form a textile pattern.
Figure 5B:
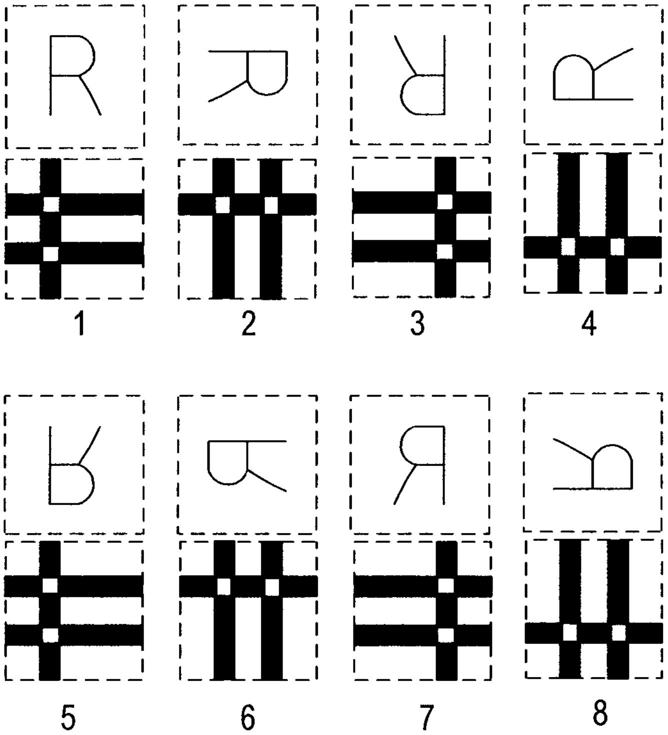
FIG. 5B depicts various orientations of the module of FIG. 5A.

FIG. 5A illustrates yet another example of a module 500 that may be used to form a textile pattern. The module 500 is depicted as having a substantially square shape defined by theoretical boundaries or edges 502, 504, 506, 508, each of which is shown as a dashed line. In this configuration, opposed edges 506, 508 extend substantially in the first direction D1 and are substantially parallel to one another, while opposed edges 502, 504 extend substantially in the second direction D2 and are substantially parallel to one another.

The module 500 includes a plurality of spaced, substantially rectangular bars 510, 512, 514, each of which is substantially equal in length and width. Bar 510 extends in the first direction D1 substantially between theoretical edges 502, 504 and is substantially perpendicular to bars 512, 514. Bars 512, 514 extend in the second direction D2 substantially between theoretical edges 506, 508 and are substantially parallel to one another. Bar 514 intersects bars 510, 512 at a point P offset a distance D from a longitudinal centerline CL drawn through the module 500. A pair of substantially square shaped voids 516, 518 respectively interrupt a portion of overlapping bars 510, 512 and 510, 514. The module 500 is substantially symmetrical along a transverse centerline CT and asymmetrical across the remaining centerlines (not labeled), such that the module 500 has an overall degree of symmetry of 1. The remaining spaces and the voids 516, 518 define a field 520 of the module 500, shown in white.

Each edge 502, 504, 506, 508 can be divided into segments a, b, b' c, with respective segments a having a substantially equal length, respective segments b, b' having a substantially equal length, and respective segments c having a substantially equal length, such that the arrangement of segment lengths is symmetric along each edge 502, 504, 506, 508. Segments a, c, and b' of edges 502, 504, 506, 508 each have a first hue (white) defined by the field 520, and segments b have a second hue (black) defined by the endpoints of bars 510, 512, 514. The respective arrangement of hues is symmetric and identical along edges 506, 508, such that edges 506, 508 readily form a perfect alignment with one another. In contrast, the arrangement of hues is identical but asymmetric along edges 502, 504. As a result, some alignments of edges 502, 504 will result in a perfect alignment, while others will instead define a plurality of shapes that terminate within the motif (best seen in FIG. 5D).

Figure 5C:
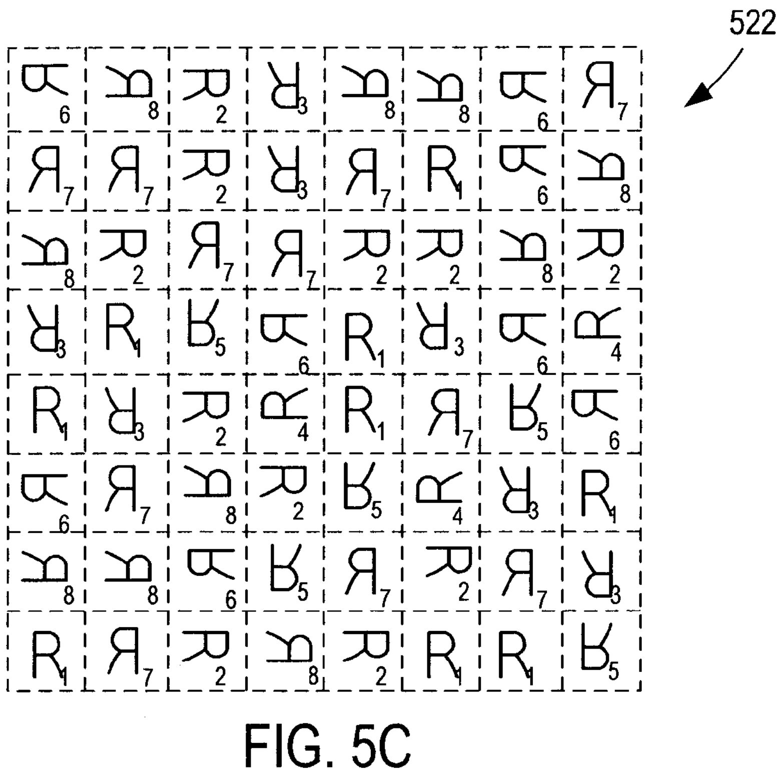
FIG. 5C depicts an exemplary arrangement of variously oriented "R" modules that may be used to form a motif.

Various orientations of the module 500 are illustrated in FIG. 5C with the corresponding "R" module. In this example, orientation 1 appears the same as orientation 5, orientation 2 appears the same as orientation 6, orientation 3 appears the same as orientation 7, and orientation 4 appears the same as orientation 9. Thus, there are four distinct orientations.

Figure 5D:
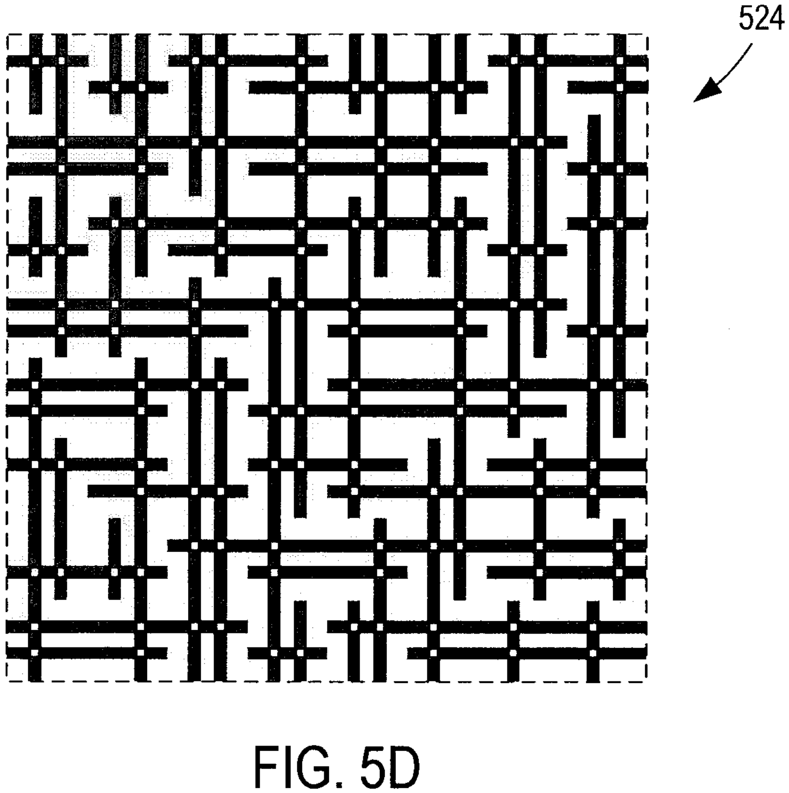
FIG. 5D depicts an exemplary motif formed by replacing the "R" modules of FIG. 5C with the modules of FIG. 5A oriented in the same manner as the "R" modules.

FIG. 5D illustrates an exemplary 8×8 array 522 of "R" modules. The "R" module may be replaced by module 500 to form a motif 524 including a plurality of interconnected bars that resemble a somewhat open lattice structure or trellis, as shown in FIG. 5D.

Figure 5E:
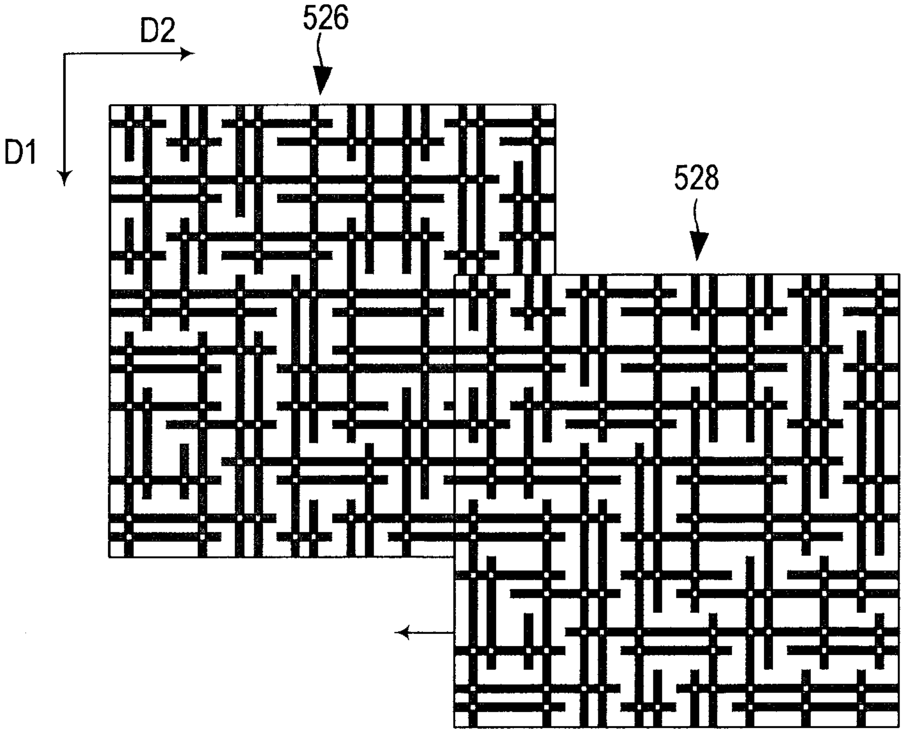
FIGS. 5E and 5F illustrate the alignment of textile pieces formed using the motif of FIG. 5D.
Figure 5F:
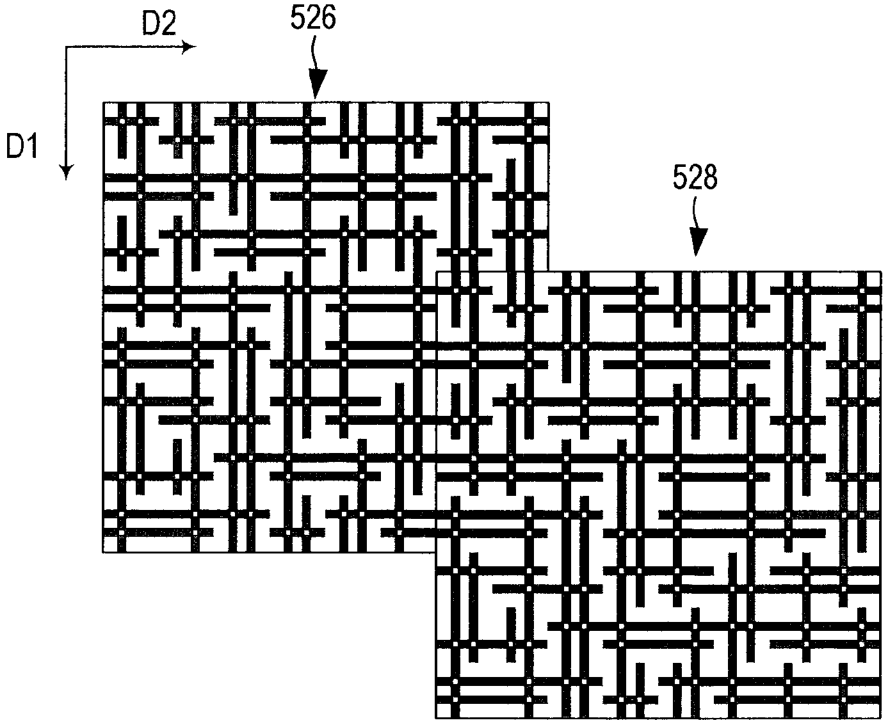

FIGS. 5E and 5F illustrate how the patterning technique facilitates alignment of textile pieces 526, 528, with FIG. 5E illustrating a misalignment of the designs on the respective pieces 526, 528 and FIG. 5F depicting an alignment of the designs on the respective pieces 526, 528. The overall design appears to be somewhat random, but continuous, despite the presence of new elements created across the seams S between the pieces 526, 528. Numerous other alignments may be made with the textile pieces 526, 528. In this example, the pieces will align at least once per module when moved in the first or second direction, in this case, at least 8 times per motif in each direction.

Example 6

Figure 6A:
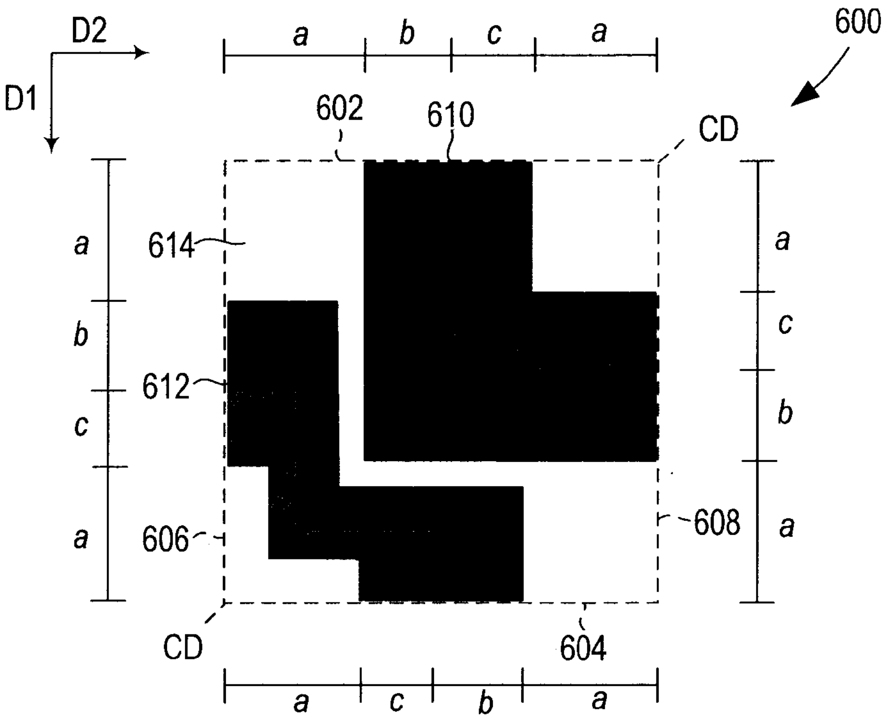
FIG. 6A depicts another exemplary module that may be used to form a textile pattern.

FIG. 6A illustrates yet another example of a module 600 that may be used to form a textile pattern. The module 500 is depicted as having a substantially square shape defined by theoretical peripheral edges 602, 604, 606, 608, each of which is shown as a dashed line. The module 600 includes a first, somewhat L-shaped element 610 and a second element 612 that resembles a zigzag. The first and second elements 610, 612 are arranged in a somewhat nested configuration. The end points of element 610 are substantially centered along and/or at least partially define theoretical edges 602, 608. Likewise, the endpoints of element 612 are substantially centered along and/or at least partially define edges 604, 606.

In this example, each of the first element and the second element is shown as having more than one color, with the darker color (shown as black) being proximate the nestled edges of each and the lighter color (shown as gray) being distal the nestled edges of each. However, it is contemplated that the elements may have only one hue, may each have a different hue, or may each have multiple hues and combinations thereof. The remainder of the module 600 comprises a field 614, shown in white. However, other hues and hue combinations may be used. The module 600 is substantially symmetrical along a diagonal centerline CD and asymmetrical along the various other centerlines. Thus, the module 600 has an overall degree of symmetry of 1.

As shown in FIG. 6A, each edge 602, 604, 606, 608 can be divided into segments a, b, c, with respective segments a having a substantially equal length and respective segments b having a substantially equal length, and respective segments c having a substantially equal length. Although each edge is divided into the same segments, segments b and c are in opposite positions on opposed edges of the module 600. The endpoints of elements 610, 612 define combined respective center segments b+c, while the field 614 defines the respective end segments a.

Figure 6B:
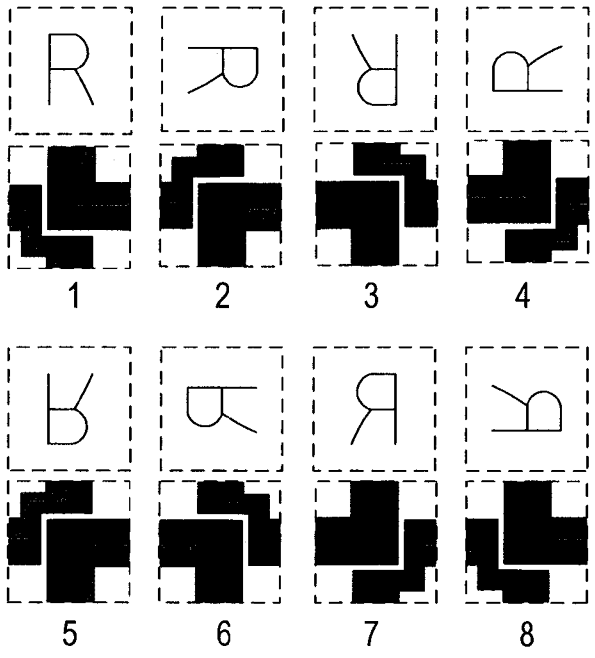
FIG. 6B depicts various orientations of the module of FIG. 6A.

Despite the use of multiple hues in elements 610, 612, this pseudo-symmetrical arrangement of elements along each edge 602, 604, 606, 608 ensures that elements 610, 612 with align with each other to create a seemingly continuous design, while the field 614 will align with itself. However, the bi-tonal nature of elements 610, 612 results in some perfect alignments and some imperfect alignments of segments. For example, viewing the various orientations of the module 600 in FIG. 6B with the corresponding "R" module provided above each orientation, the lateral alignment of orientations 1 and 6, for example, will result in an imperfect alignment of segments b and c, while the lateral alignment of orientations 1 and 7 will result in a perfect alignment of segments b and c. It is noted that, in this example, orientation 1 as appears the same as orientation 8, orientation 2 as appears the same as orientation 5, orientation 3 as appears the same as orientation 6, and orientation 4 as appears the same as orientation 7. Thus, there are four distinct orientations.

Figure 6C:
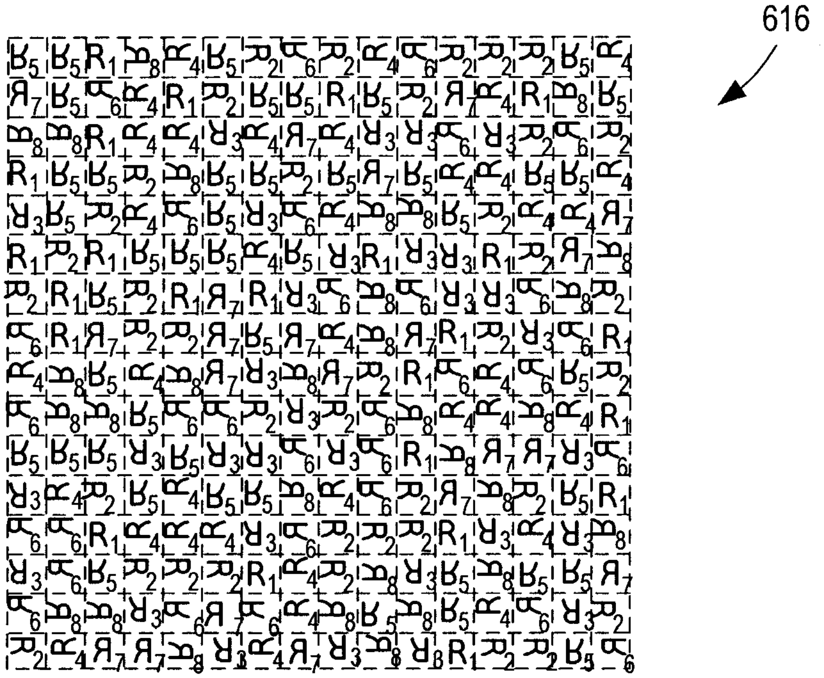
FIG. 6C depicts an exemplary arrangement of variously oriented "R" modules that may be used to form a motif.
Figure 6D:
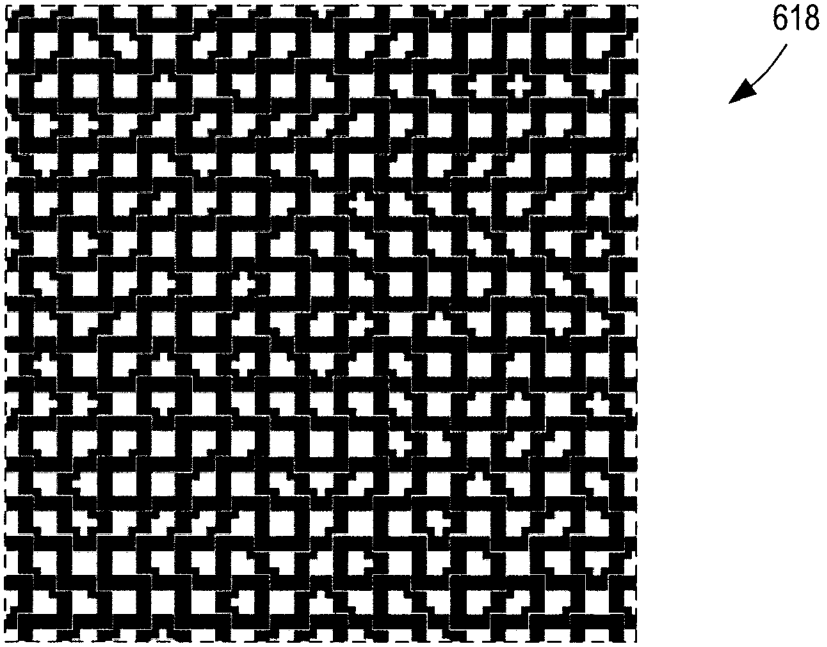
FIG. 6D depicts an exemplary motif formed by replacing the "R" modules of FIG. 6C with the modules of FIG. 6A oriented in the same manner as the "R" modules.

FIG. 6C illustrates an exemplary 16×16 array 616 of "R" modules. The resulting motif 618 includes a plurality of interconnected elements that resemble a lattice structure or overlapping staircases, as shown in FIG. 6D (in which the dual tones are difficult to discern).

Figure 6E:
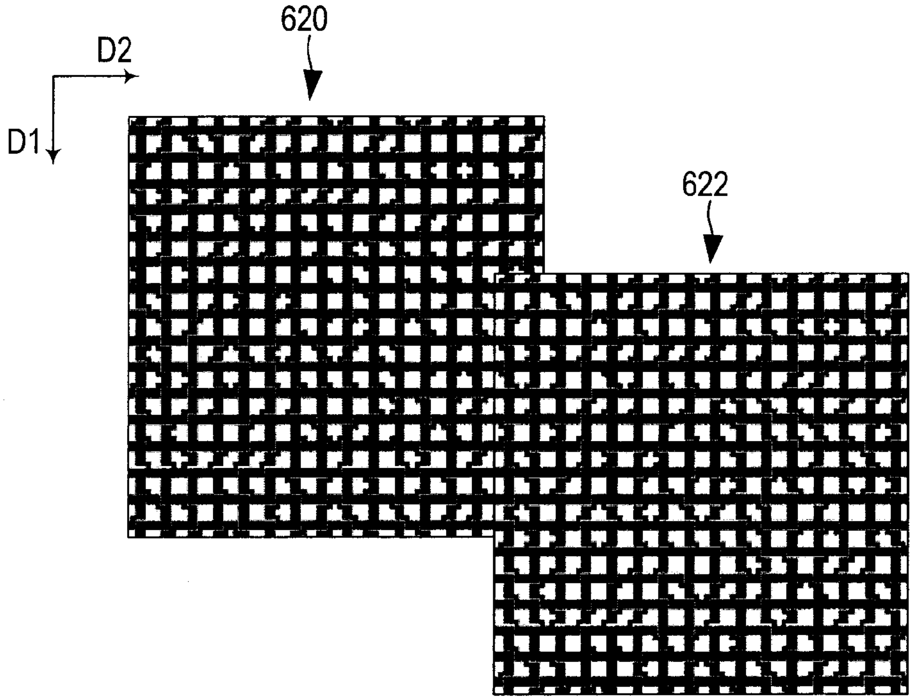
FIGS. 6E and 6F illustrate the alignment of textile pieces formed using the motif of FIG. 6D.
Figure 6F:
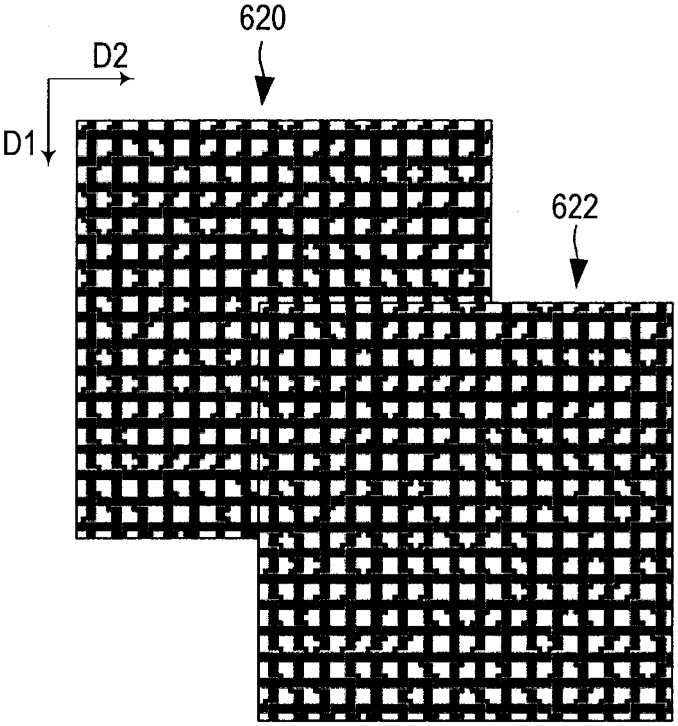

FIGS. 6E and 6F illustrate how the patterning technique facilitates alignment of textile pieces 620, 622, with FIG. 6E illustrating a misalignment of the designs on the respective pieces 620, 622 and FIG. 6F depicting an alignment of the designs on the respective pieces 620, 622. As with the various other examples, the overall design appears to be somewhat random, yet continuous, despite the presence of new elements formed across the seams.

Example 7

Figure 7A:
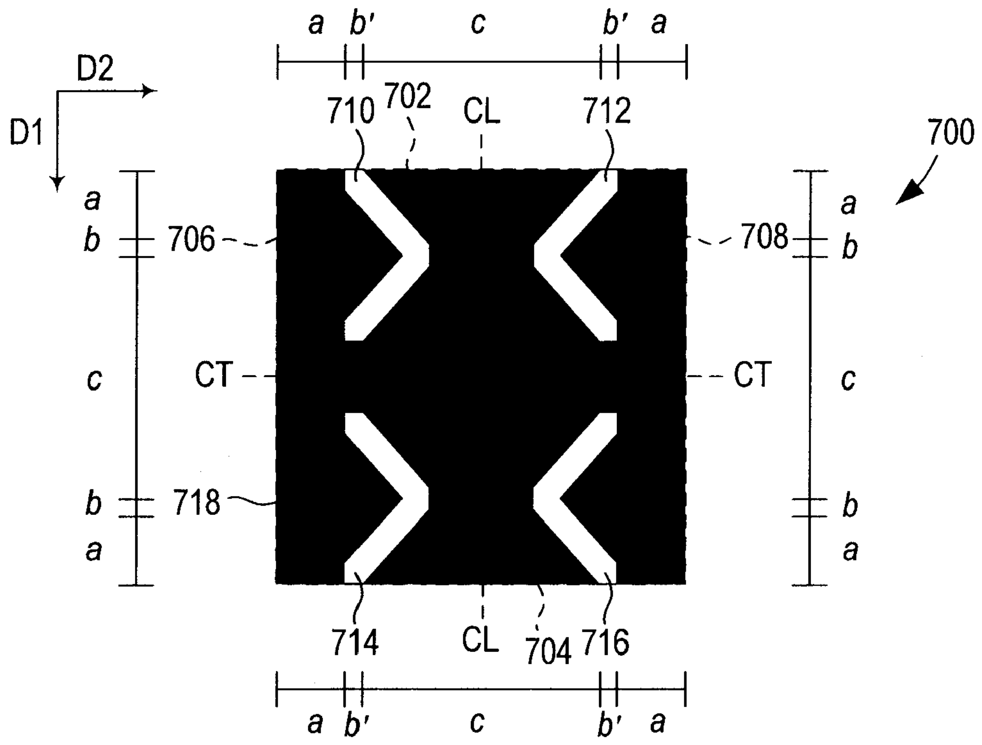
FIG. 7A depicts still another exemplary module that may be used to form a textile pattern.

FIG. 7A illustrates still another module 700 having a substantially square shape defined by theoretical edges 702, 704, 706, 708, each of which is shown as a dashed line. The module 700 includes a plurality of substantially V-shaped elements 710, 712, 714, 716, each of which is shown in white, and a field 718, shown in black. Elements 710, 712 each abut edge 702 and elements 714, 716 each abut edge 704. Each of the elements 710, 712, 714, 716 is positioned within the module 700 with the narrowest part of the "V" proximate to a longitudinal centerline CL. The module 700 is substantially symmetrical along the longitudinal centerline CL and a transverse centerline CT, and is asymmetrical across each of the diagonal centerlines (not labeled), such that the module 700 has an overall degree of symmetry of 2.

Each edge 702, 704, 706, 708 can be divided into segments a, b, b' c, with respective segments a having a substantially equal length, respective segments b, b' having a substantially equal length, and respective segments c having a substantially equal length, such that the arrangement of segment lengths is symmetrical along each edge 702, 704, 706, 708. Segments a, b, and c have a first hue (black) defined by the field 718. In contrast, respective segments b' have a white hue defined by elements 710, 712, 714, 716. Each edge features bidirectional symmetry, with edges 702, 704 being identical to one another and edges 706, 708 being identical to one another. As such, edges 702, 704 form perfect alignments with one another and edges 706, 708 form perfect alignments with one another. Other alignments result in imperfect matching of segments b and b' (FIG. 7D).

Figure 7B:
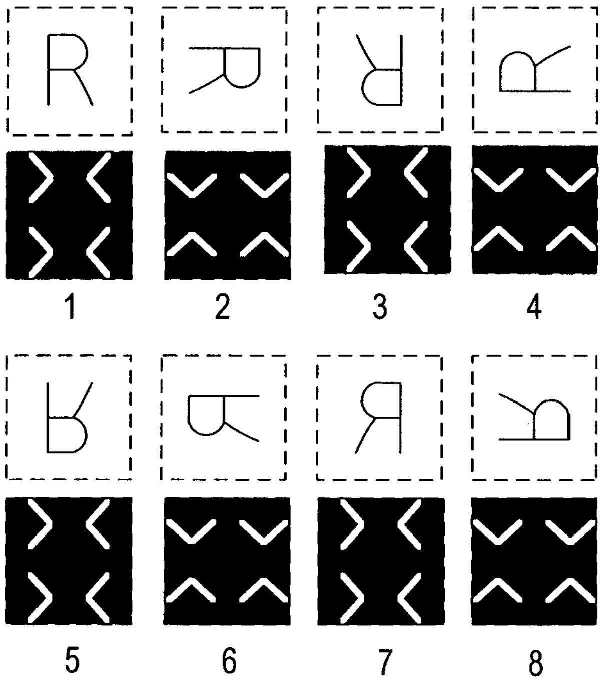
FIG. 7B depicts various orientations of the module of FIG. 7A.

Various orientations of the module 700 are illustrated in FIG. 7B with the corresponding "R" module provided above each orientation. In this example, orientations 1, 3, 5, and 7 appear the same, and orientations 2, 4, 6, and 8 appear the same. Thus, there are two distinct orientations.

Figure 7C:
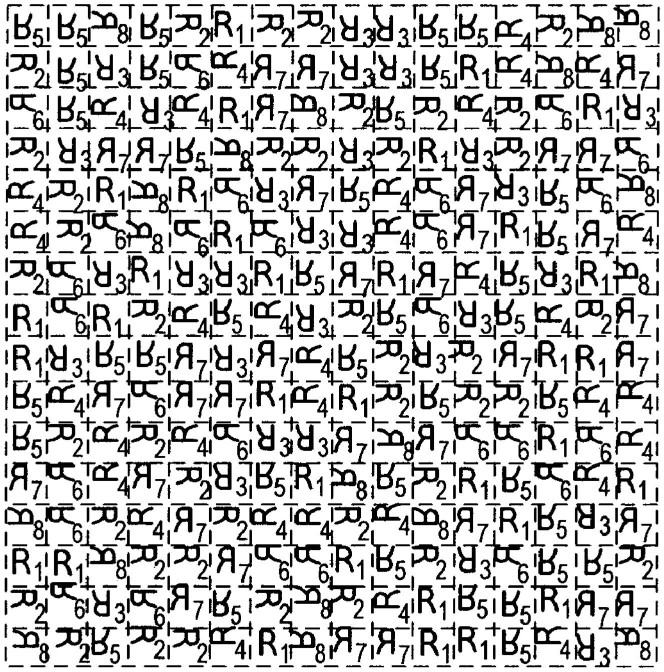
FIG. 7C depicts an exemplary arrangement of variously oriented "R" modules that may be used to form a motif.
Figure 7D:
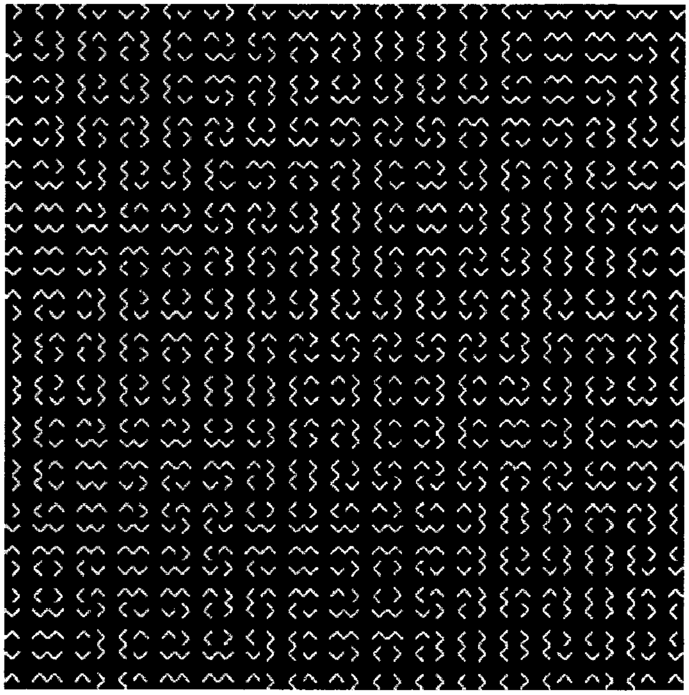
FIG. 7D depicts an exemplary motif formed by replacing the "R" modules of FIG. 7C with the modules of FIG. 7A oriented in the same manner as the "R" modules.

FIG. 7C illustrates an exemplary 16×16 array 720 of "R" modules. With the "R" module replaced with module 700, the resulting textile repeat unit 722 includes a plurality of square shaped arrangements of v's and other new elements that resemble w's, m's, and zigzags, as shown in FIG. 7D.

Figure 7E:
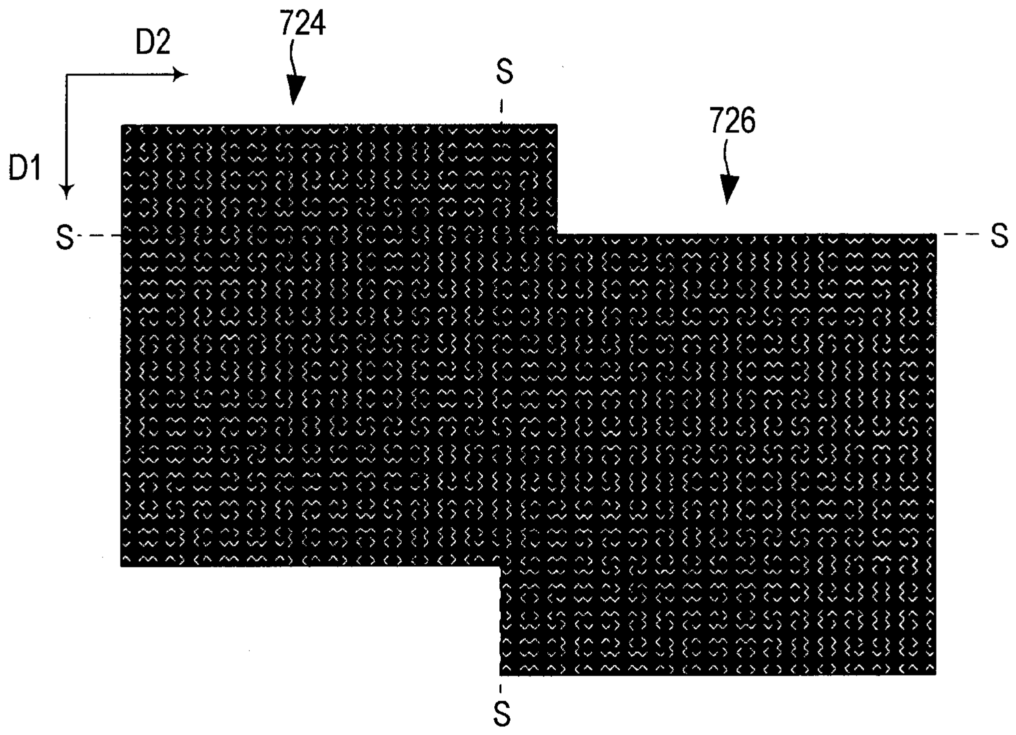
FIGS. 7E and 7F illustrate the alignment of textile pieces formed using the motif of FIG. 7D.
Figure 7F:
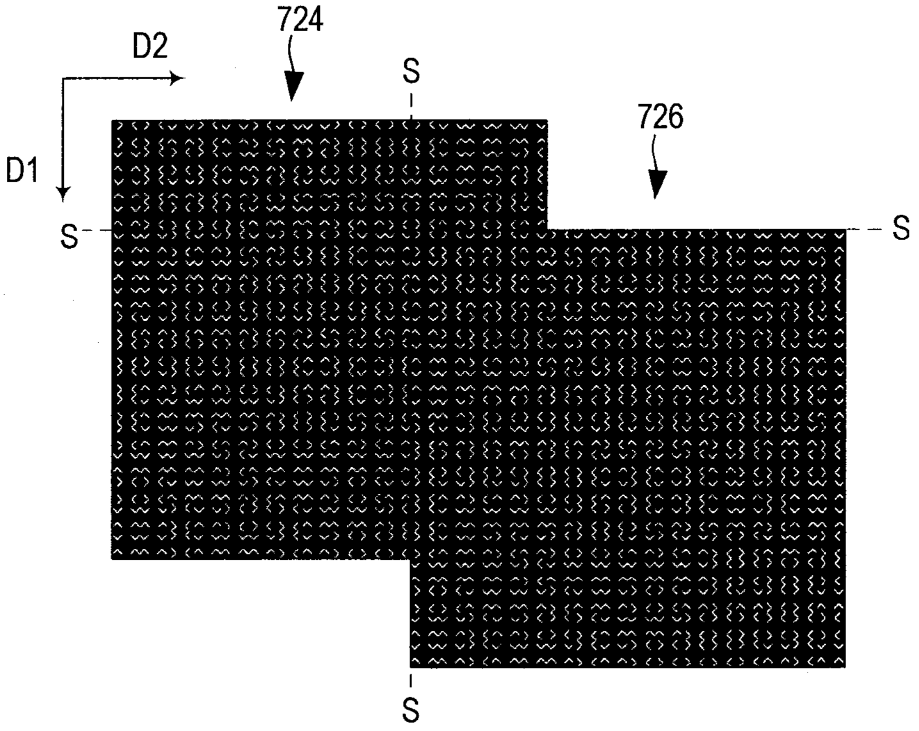

FIGS. 7E and 7F illustrate how the patterning technique facilitates alignment of textile pieces 724, 726, with FIG. 7E illustrating a misalignment of the respective designs and FIG. 7F depicting an alignment of the respective designs. The overall design appears to be somewhat random, but consistent with the repeating motif, despite the presence of new elements created across the seams S.

Example 8

Figure 8A:
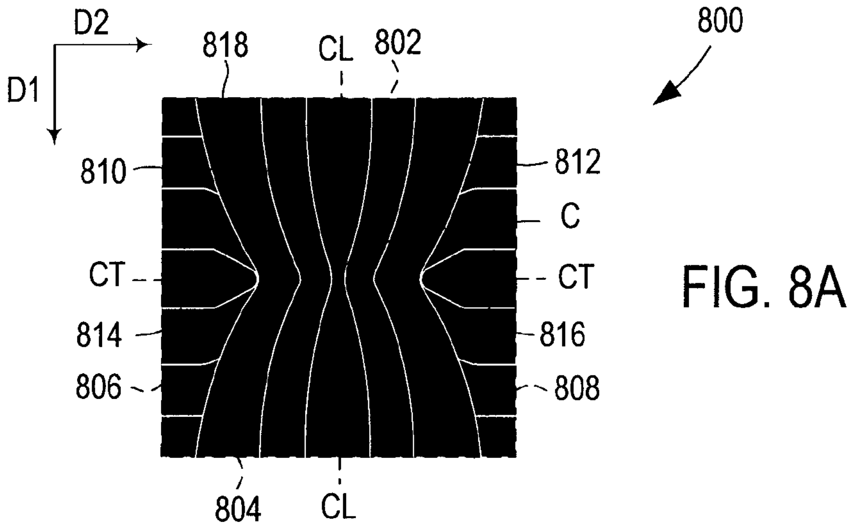
FIG. 8A depicts still another exemplary module that may be used to form a textile pattern.

FIG. 8A illustrates yet another example of a module 800 that may be used to form a textile pattern. The module 800 has a generally square shape defined by a plurality of theoretical peripheral edges 802, 804, 806, 808 shown in dashed form.

The module 800 includes a plurality of curvilinear elements (i.e., arcuate or curved lines) extending in a first or longitudinal direction D1 substantially between edges 802, 804, including outermost lines 810, 812 respectively closest to edges 806, 808. Each of the longitudinal elements, including elements 810, 812, converges slightly towards a center C of the module 800, which also corresponds to a midpoint of the longitudinal centerline CL and a midpoint of the transverse centerline CT.

The module 800 also includes a plurality of curvilinear elements 814 (i.e. curves and lines) extending in a second or transverse direction D2 substantially between edge 806 and longitudinal curved line 810, and a plurality of curvilinear elements 816 (i.e. curves and lines) extending in the second or transverse direction D2 substantially between edge 808 and longitudinal curved line 812. The outermost elements 814, 816 respectively proximate to edges 802, 804 are substantially linear, while the innermost elements 814, 816 proximate to the transverse centerline CT are substantially curved. However, other arrangements are contemplated.

Each of the plurality of elements 814 is respectively aligned in the longitudinal direction D1 with a corresponding element of the plurality of elements 816. The module is symmetrical along a transverse centerline CT and a longitudinal centerline CL and asymmetrical across each of the diagonal centerlines (not labeled), such that the module 800 has an overall degree of symmetry of 2.

Each edge 802, 804, 806, 808 can be divided into 13 segments with respective segments along each edge 802, 804, 806, 808 having a substantially equal length. The segments alternate a between a first hue (black) and second hue (white), such that the respective arrangement of segment lengths and hues is symmetrical and identical along each edge 802, 804, 806, 808. Thus, each edge 802, 804, 806, 808 forms a perfect alignment with each other edge 802, 804, 806, 808.

Figure 8B:
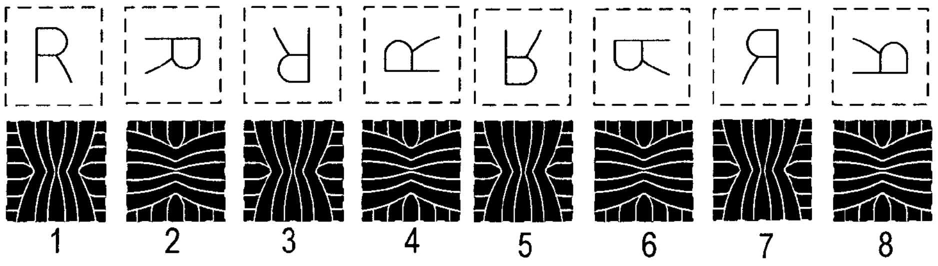
FIG. 8B depicts various orientations of the module of FIG. 8A.

Various orientations of the module 800 are illustrated in FIG. 8B with the corresponding "R" module. In this example, orientations 1, 3, 5, and 7 appear the same, and orientations 2, 4, 6, and 8 appear the same. Thus, there are two distinct orientations.

Figure 8C:
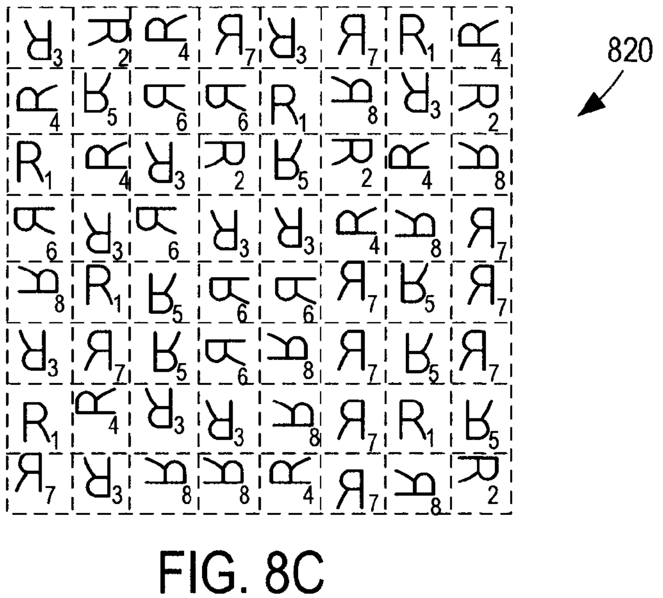
FIG. 8C depicts an exemplary arrangement of variously oriented "R" modules that may be used to form a motif.
Figure 8D:
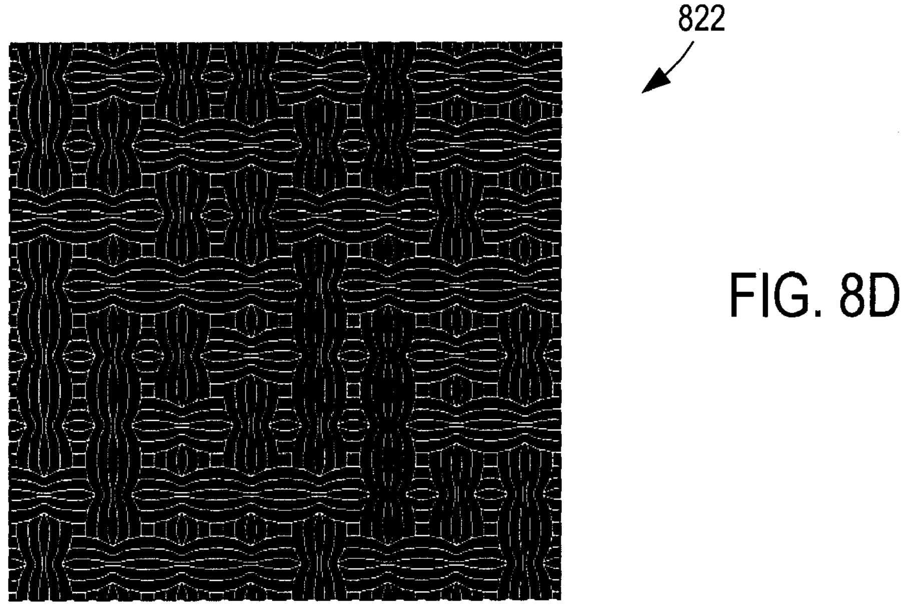
FIG. 8D depicts an exemplary motif formed by replacing the "R" modules of FIG. 8C with the module of FIG. 8A oriented in the same manner as the "R" modules.

FIG. 8C illustrates an exemplary 8×8 array 820 of "R" modules that may be replaced by module 800 to form the motif 822 depicted in FIG. 8D. The pattern generally resembles a basket weave.

Figure 8E:
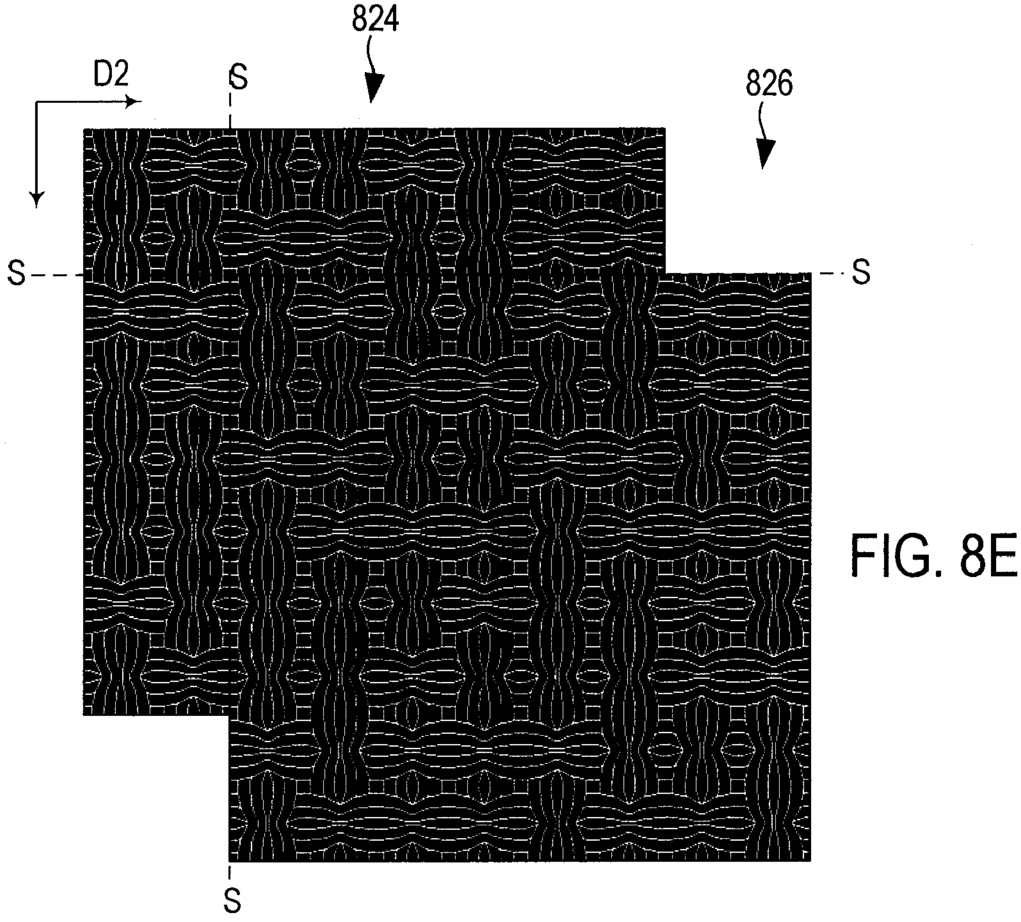
FIG. 8E depicts an exemplary alignment of textile pieces formed from the motif of FIG. 8D.

It will be appreciated that the motif 822 may be used to form various textiles and, therefore textile pieces, that may be aligned readily by making minor adjustments to the positioning of one or multiple pieces relative to one another, as described in connection with the various other examples set forth herein. One example of an alignment of textile pieces 824, 826 is shown in FIG. 8E.

Figure 9A:
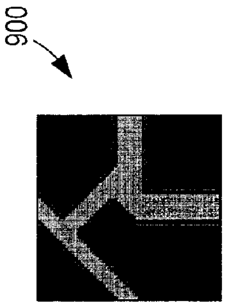
FIG. 9A depicts another exemplary module that may be used to form a textile pattern.
Figure 9B:
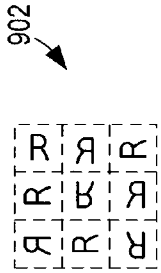
FIG. 9B depicts an exemplary arrangement of variously oriented "R" modules that may be used to form a motif.
Figure 9C:
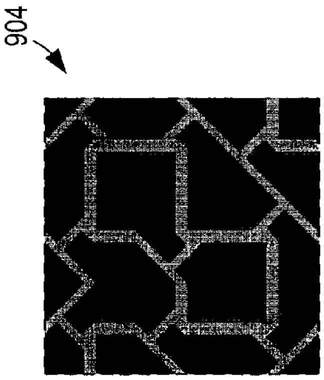
FIG. 9C depicts an exemplary motif formed by replacing the "R" modules of FIG. 9B with the module of FIG. 9A oriented in the same manner as the "R" modules.

FIGS. 9A and 9B respectively depict yet another exemplary module 900 and exemplary array 902 of "R" modules that may be used to form a motif 904 (FIG. 9C). In this example, each edge of the module 900 exhibits bidirectional symmetry. The module has no bisecting lines of symmetry, and therefore has an overall degree of symmetry of 0. Thus, the module has eight distinct orientations (not shown).

Figure 10A:
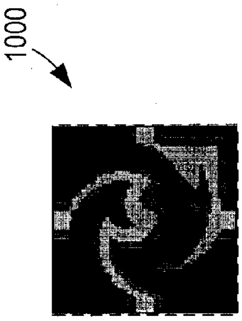
FIG. 10A depicts another exemplary module that may be used to form a textile pattern.
Figure 10B:
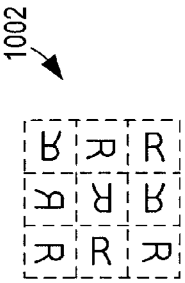
FIG. 10B depicts an exemplary arrangement of variously oriented "R" modules that may be used to form a motif.
Figure 10C:
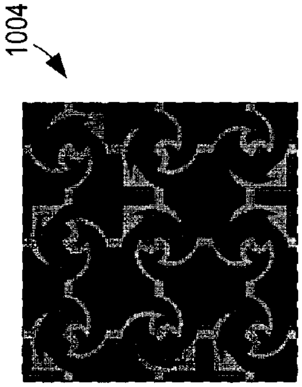
FIG. 10C depicts an exemplary motif formed by replacing the "R" modules of FIG. 10B with the module of FIG. 10A oriented in the same manner as the "R" modules.

FIGS. 10A and 10B respectively depict another exemplary module 1000 and exemplary array 1002 of "R" modules that may be used to form a motif 1004 (FIG. 10C). In this example, each edge of the module 1000 exhibits bidirectional symmetry. The module has no bisecting lines of symmetry, and therefore has an overall degree of symmetry of 0. The module has eight distinct orientations (not shown).

Figure 11A:
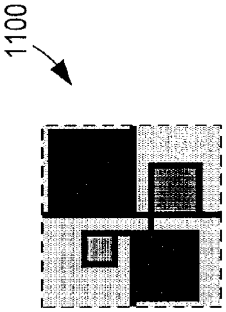
FIG. 11A depicts another exemplary module that may be used to form a textile pattern.
Figure 11B:
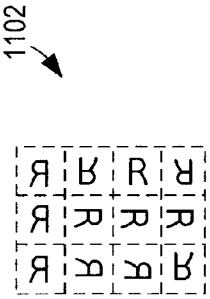
FIG. 11B depicts an exemplary arrangement of variously oriented "R" modules that may be used to form a motif.
Figure 11C:
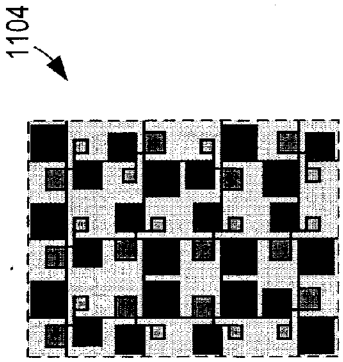
FIG. 11C depicts an exemplary motif formed by replacing the "R" modules of FIG. 11B with the module of FIG. 11A oriented in the same manner as the "R" modules.

FIGS. 11A and 11B respectively depict still another exemplary module 1100 and exemplary array 1102 of "R" modules that may be used to form a motif 1104 (FIG. 11C). In this example, each edge of the module 1100 exhibits bidirectional symmetry. The module has no bisecting lines of symmetry, and therefore has an overall degree of symmetry of 0. Thus, the module has eight distinct orientations (not shown).

Figure 12A:
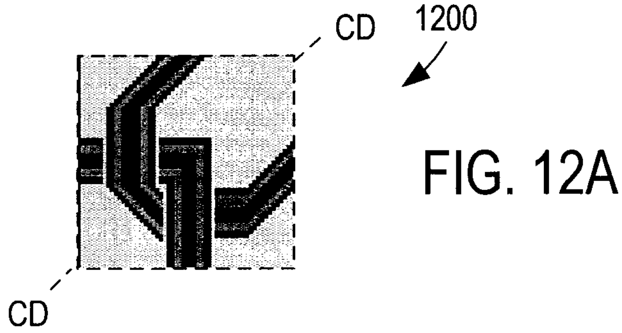
FIG. 12A depicts another exemplary module that may be used to form a textile pattern.
Figure 12B:
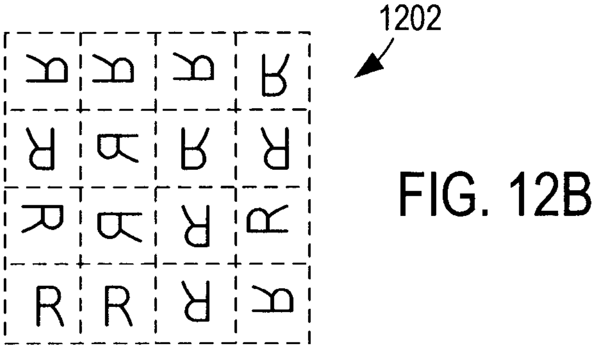
FIG. 12B depicts an exemplary arrangement of variously oriented "R" modules that may be used to form a motif.
Figure 12C:
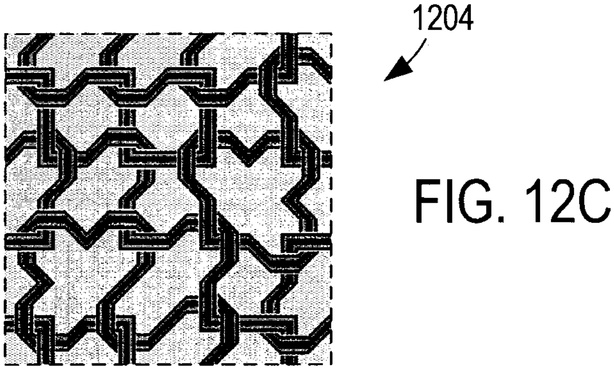
FIG. 12C depicts an exemplary motif formed by replacing the "R" modules of FIG. 12B with the module of FIG. 12A oriented in the same manner as the "R" modules.
Figure 12D:
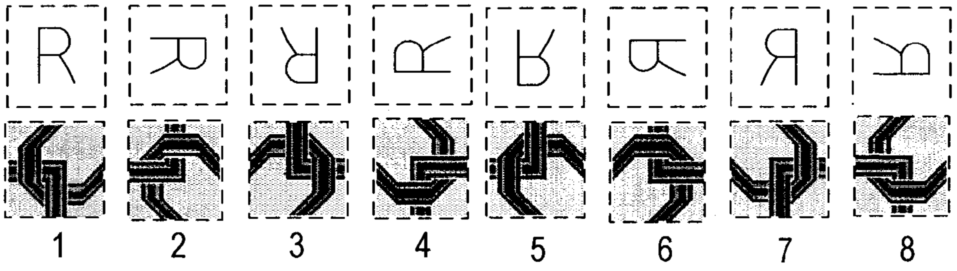
FIG. 12D depicts various orientations of the module of FIG. 12A.

FIGS. 12A and 12B respectively depict yet another exemplary module 1200 and exemplary array 1202 of "R" modules that may be used to form a motif 1204 (FIG. 12C). In this example, each edge of the module 1200 exhibits bidirectional symmetry. The module has an apparent line of symmetry CD, but the over-and-under pattern of the design elements removes the actual appearance of symmetry. However, there is a "hidden" symmetry, because there are only four distinct orientations, as shown in FIG. 12D.

Although certain embodiments of this invention have been described with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are used only for identification purposes to aid the reader's understanding of the various embodiments of the present invention, and do not create limitations, particularly as to the position, orientation, or use of the invention unless specifically set forth in the claims. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other.

Accordingly, it will be readily understood by those persons skilled in the art that, in view of the above detailed description of the invention, the present invention is susceptible of broad utility and application. Many adaptations of the present invention other than those herein described, as well as many variations, modifications, and equivalent arrangements will be apparent from or reasonably suggested by the present invention and the above detailed description thereof, without departing from the substance or scope of the invention as set forth in the following claims.

While the present invention is described herein in detail in relation to specific aspects, it is to be understood that this detailed description is only illustrative and exemplary of the present invention and is made merely for purposes of providing a full and enabling disclosure of the present invention and to provide the best mode contemplated by the inventor or inventors of carrying out the invention. The detailed description set forth herein is not intended nor is to be construed to limit the present invention or otherwise to exclude any such other embodiments, adaptations, variations, modifications, and equivalent arrangements of the present invention.

What is claimed is:

1. A method of making a textile pattern, the method comprising:

forming a design module, the design module having a substantially square shape;

forming a motif from the design module, wherein forming the motif from the design module comprises repeating the design module to form a unitary array of design modules, wherein adjacent design modules of the unitary array of design modules are contiguous with one another, and wherein the design modules of the unitary array of design modules have various orientations with respect to one another in fixed positions within the unitary array so that a first design module of the unitary array has a first orientation and a second design module of the unitary array has a second orientation, wherein the design module having the first orientation is visually distinct from the design module having the second orientation; and repeating the motif along a length and a width of a continuous textile web so that the continuous textile web comprises a first occurrence of the motif and a second occurrence of the motif, the first occurrence of the motif and the second occurrence of the motif each comprising respective portions of the continuous textile web, wherein the first occurrence of the motif and the second occurrence of the motif each comprise the unitary array of design modules.

2. The method of claim 1, wherein the first occurrence of the motif and the second occurrence of the motif are adjacent to one another along the length or width of the continuous textile web.

3. The method of claim 1, wherein the continuous textile web further comprises at least a third occurrence of the motif.

4. The method of claim 1, wherein repeating the motif along the length and width of the continuous textile web comprises tufting the continuous textile web.

5. The method of claim 1, wherein the continuous textile web comprises a carpet.

6. The method of claim 5, wherein the carpet comprises a roll good.

7. The method of claim 1, wherein forming the design module comprises forming the design module so that the design module is substantially symmetrical about a first diagonal centerline extending between a first pair of diagonally opposed corners of the design module.

8. The method of claim 7, wherein forming the design module further comprises forming the design module so that the design module is symmetrical about a second diagonal centerline extending between a second pair of diagonally opposed corners of the design module, the first diagonal centerline being orthogonal to the second diagonal centerline.

9. The method of claim 1, wherein forming the design module further comprises forming the design module so that the design module includes a background comprising a first hue, and a design element comprising a second hue, the second hue being different from the first hue.

10. The method of claim 9, wherein the unitary array of design modules includes at least one design element that differs from the design element of the design module repeated to form the unitary array of design modules.

11. The method of claim 9, wherein repeating the design module to form the unitary array of design modules comprises arranging the design modules so that the first design module and the second design module are adjacent to one another within the unitary array of design modules, and the method comprises defining a new design element that differs from the design element of the design module repeated to form the unitary array of design modules, wherein defining the new design element comprises aligning an edge of the first design module with an edge of the second design module so that the first design module and the second design module are in an edge-to-edge relationship, and so that the design element of the first design module and the design element of the second module are aligned with one another to define the new design element that differs from the design element of the design module.

12. The method of claim 9, wherein the first design module and the second design module are adjacent to one another within the unitary array of design modules, and at least one of the background and the design element serves as a visual connection point between the first design module and the second design module.

13. The method of claim 9, wherein the first design module and the second design module are adjacent to one another within the unitary array of design modules, and the design element of the first design module and the design element of the second design module substantially abut and substantially align with one another so that the design element of the first design module and the design element of the second design module are substantially continuous.

14. The method of claim 9, wherein the first design module and the second design module are adjacent to one another within the unitary array of design modules, and the design element of the first design module and the design element of the second design module are at least partially misaligned with one another so that a discontinuity is created between the design element of the first design module and the design element of the second design module.

15. The method of claim 1, wherein forming the design module comprises arranging a first arrangement of hues along a first peripheral edge of the design module, and arranging a second arrangement of hues along a second peripheral edge of the design module, wherein the first arrangement of hues is substantially identical to the second arrangement of hues.

16. The method of claim 15, wherein the first arrangement of hues is arranged so that the first arrangement of hues is symmetric about a midpoint of the first peripheral edge, and the second arrangement of hues is arranged so that the second arrangement of hues is symmetric about a midpoint of the second peripheral edge.

17. The method of claim 16, wherein forming the design module further comprises arranging a third arrangement of hues adjacent to a third peripheral edge of the design module, and arranging a fourth arrangement of hues adjacent to a fourth peripheral edge of the design module, wherein the third arrangement of hues and the second arrangement of hues are substantially identical to the first arrangement of hues and the second arrangement of hues.

18. The method of claim 1, wherein forming the design module comprises providing the design module with a design element, and repeating the design module to form the unitary array of design modules comprises arranging the design modules in an edge-to-edge relationship with one another, wherein arranging the design modules in an edge-to-edge relationship with one another defines a new design element that differs from the design element of the design module.

19. The method of claim 18, wherein arranging the design modules in the edge-to-edge relationship comprises arranging the design modules so that the first design module and the second design module are adjacent to one another in the edge-to edge relationship within the unitary array of design modules, wherein the edge-to-edge alignment of the first design module and the second design module is a perfect alignment, such that the design element of the first design module and the design element of the second design module substantially abut and substantially align with one another so that the design element of the first design module is substantially continuous with the design element of the second design module.

20. The method of claim 18, wherein arranging the design modules in the edge-to-edge relationship comprises arranging the design modules so that the first design module and the second design module are adjacent to one another in the edge-to edge relationship within the unitary array of design modules, wherein the edge-to-edge alignment of the first design module and the second design module is an imperfect alignment such that the design element of the first design module and the design element of the second design module are misaligned with one another so that a discontinuity is created between the design element of the first design module and the design element of the second design module.

21. The method of claim 1, wherein forming the design module comprises forming the design module so that the design module is asymmetrical about a first diagonal centerline extending between a first pair of diagonally opposed corners of the design module.

22. The method of claim 21, wherein forming the design module further comprises forming the design module so that the design module is asymmetrical about a second diagonal centerline extending between a second pair of diagonally opposed corners of the design module, the first diagonal centerline being orthogonal to the second diagonal centerline.

23. The method of claim 21, wherein forming the design module further comprises forming the design module so that the design module is symmetrical about a second diagonal centerline extending between a second pair of diagonally opposed corners of the design module, the first diagonal centerline being orthogonal to the second diagonal centerline.

24. A method of making a textile pattern, the method comprising:

preparing a design module having a substantially square shape;

preparing a plurality of orientations of the design module, wherein preparing the plurality of orientations of the design module comprises at least one of rotating and inverting the design module so that a first orientation of the design module is visually distinct from at least from a second orientation of the design module;

forming a motif from the plurality of orientations of the design module, wherein forming the motif comprises repeating the design module to form a unitary array of design modules with adjacent design modules of the unitary array of design modules being contiguous with one another, the design modules of the unitary array having the plurality of orientations so that a first design module of the unitary array has the first orientation and a second design module of the unitary array has the second orientation; and repeating the motif along a length and a width of a continuous textile web so that the continuous textile web comprises a first occurrence of the motif and a second occurrence of the motif, the first occurrence of the motif and the second occurrence of the motif each comprising the unitary array of design modules.

25. The method of claim 24, wherein the first occurrence of the motif and the second occurrence of the motif are adjacent to one another along the length or width of the continuous textile web.

26. The method of claim 24, wherein the continuous textile web further comprises at least a third occurrence of the motif.

27. The method of claim 24, wherein the continuous textile web comprises a carpet.

28. The method of claim 27, wherein the carpet comprises a roll good.

29. The method of claim 24, wherein preparing the design module comprises preparing the design module so that the design module is substantially symmetrical about a first diagonal centerline extending between a first pair of diagonally opposed corners of the design module.

30. The method of claim 29, wherein preparing the design module further comprises preparing the design module so that the design module is symmetrical about a second diagonal centerline extending between a second pair of diagonally opposed corners of the design module, the first diagonal centerline being orthogonal to the second diagonal centerline.

31. The method of claim 24, wherein preparing the design module comprises preparing the design module so that the design module is asymmetrical about a first diagonal centerline extending between a first pair of diagonally opposed corners of the design module.

32. The method of claim 31, wherein preparing the design module further comprises preparing the design module so that the design module is asymmetrical about a second diagonal centerline extending between a second pair of diagonally opposed corners of the design module, the first diagonal centerline being orthogonal to the second diagonal centerline.

33. The method of claim 31, wherein preparing the design module further comprises preparing the design module so that the design module is symmetrical about a second diagonal centerline extending between a second pair of diagonally opposed corners of the design module, the first diagonal centerline being orthogonal to the second diagonal centerline.

34. The method of claim 24, wherein preparing the design module further comprises preparing the design module so that the design module includes a background comprising a first hue, and a design element comprising a second hue, the second hue being different from the first hue.

35. The method of claim 34, wherein the unitary array of design modules includes at least one design element that differs from the design element of the design module repeated to form the unitary array of design modules.

36. The method of claim 34, wherein repeating the design module to form the unitary array of design modules comprises arranging the design modules so that the first design module and the second design module are adjacent to one another within the unitary array of design modules, and the method comprises defining a new design element that differs from the design element of the design module repeated to form the unitary array of design modules, wherein defining the new design element comprises aligning an edge of the first design module with an edge of the second design module so that the first design module and the second design module are in an edge-to-edge relationship, and so that the design element of the first design module and the design element of the second module are aligned with one another to define the new design element that differs from the design element of the design module.

37. The method of claim 34, wherein the first design module and the second design module are adjacent to one another within the unitary array of design modules, and at least one of the background and the design element serves as a visual connection point between the first design module and the second design module.

38. The method of claim 34, wherein the first design module and the second design module are adjacent to one another within the unitary array of design modules, and the design element of the first design module and the design element of the second design module substantially abut and substantially align with one another so that the design element of the first design module and the design element of the second design module are substantially continuous.

39. The method of claim 34, wherein the first design module and the second design module are adjacent to one another within the unitary array of design modules, and the design element of the first design module and the design element of the second design module are at least partially misaligned with one another so that a discontinuity is created between the design element of the first design module and the design element of the second design module.

40. The method of claim 24, wherein preparing the design module comprises arranging a first arrangement of hues along a first peripheral edge of the design module, and arranging a second arrangement of hues along a second peripheral edge of the design module, wherein the first arrangement of hues is substantially identical to the second arrangement of hues.

41. The method of claim 40, wherein the first arrangement of hues is arranged so that the first arrangement of hues is symmetric about a midpoint of the first peripheral edge, and the second arrangement of hues is arranged so that the second arrangement of hues is symmetric about a midpoint of the second peripheral edge.

42. The method of claim 41, wherein preparing the design module further comprises arranging a third arrangement of hues adjacent to a third peripheral edge of the design module, and arranging a fourth arrangement of hues adjacent to a fourth peripheral edge of the design module, wherein the third arrangement of hues and the second arrangement of hues are substantially identical to the first arrangement of hues and the second arrangement of hues.

43. The method of claim 24, wherein preparing the design module comprises providing the design module with a design element, and repeating the design module to form the unitary array of design modules comprises arranging the design modules in an edge-to-edge relationship with one another, wherein arranging the design modules in an edge-to-edge relationship with one another defines a new design element that differs from the design element of the design module.

44. The method of claim 43, wherein arranging the design modules in the edge-to-edge relationship comprises arranging the design modules so that the first design module and the second design module are adjacent to one another in the edge-to edge relationship within the unitary array of design modules, wherein the edge-to-edge alignment of the first design module and the second design module is a perfect alignment, such that the design element of the first design module and the design element of the second design module substantially abut and substantially align with one another so that the design element of the first design module is substantially continuous with the design element of the second design module.

45. The method of claim 43, wherein arranging the design modules in the edge-to-edge relationship comprises arranging the design modules so that the first design module and the second design module are adjacent to one another in the edge-to edge relationship within the unitary array of design modules, wherein the edge-to-edge alignment of the first design module and the second design module is an imperfect alignment such that the design element of the first design module and the design element of the second design module are misaligned with one another so that a discontinuity is created between the design element of the first design module and the design element of the second design module.

46. A method of making a textile pattern, the method comprising:

preparing a design module, the design module being substantially square in shape;

repeating the design module to form a unitary array of design modules, the array of design modules having a predetermined number of rows and columns, the rows and columns of the array each comprising the repeated design module, wherein the design modules of the unitary array of design modules are contiguous with one another and variously oriented with respect to one another so that at least two of the design modules of the unitary array of design modules are visually distinct from one another within the unitary array of design modules, wherein the unitary array of design modules defines a motif for being repeated along a length and a width of a continuous textile web; and forming the continuous textile web, wherein forming the continuous textile web comprises repeating the motif repeated along the length and width of the continuous textile web so that the continuous textile web comprises a first occurrence of the motif and a second occurrence of the motif, the first occurrence of the motif and the second occurrence of the motif each comprising the unitary array of design modules.

47. The method of claim 46, wherein the first occurrence of the motif and the second occurrence of the motif are adjacent to one another along the length or width of the continuous textile web.

48. The method of claim 46, wherein the continuous textile web further comprises at least a third occurrence of the motif.

49. The method of claim 46, wherein the continuous textile web comprises a carpet.

50. The method of claim 49, wherein the carpet comprises a roll good.

51. The method of claim 46, wherein preparing the design module comprises preparing the design module so that the design module is substantially symmetrical about a first diagonal centerline extending between a first pair of diagonally opposed corners of the design module.

52. The method of claim 51, wherein preparing the design module further comprises preparing the design module so that the design module is symmetrical about a second diagonal centerline extending between a second pair of diagonally opposed corners of the design module, the first diagonal centerline being orthogonal to the second diagonal centerline.

53. The method of claim 46, wherein preparing the design module comprises preparing the design module so that the design module is asymmetrical about a first diagonal centerline extending between a first pair of diagonally opposed corners of the design module.

54. The method of claim 53, wherein preparing the design module further comprises preparing the design module so that the design module is asymmetrical about a second diagonal centerline extending between a second pair of diagonally opposed corners of the design module, the first diagonal centerline being orthogonal to the second diagonal centerline.

55. The method of claim 53, wherein preparing the design module further comprises preparing the design module so that the design module is symmetrical about a second diagonal centerline extending between a second pair of diagonally opposed corners of the design module, the first diagonal centerline being orthogonal to the second diagonal centerline.

56. The method of claim 46, wherein preparing the design module further comprises preparing the design module so that the design module includes a background comprising a first hue, and a design element comprising a second hue, the second hue being different from the first hue.

57. The method of claim 56, wherein the unitary array of design modules includes at least one design element that differs from the design element of the design module repeated to form the unitary array of design modules.

58. The method of claim 56, wherein repeating the design module to form the unitary array of design modules comprises arranging the design modules so that the first design module and the second design module are adjacent to one another within the unitary array of design modules, and the method comprises defining a new design element that differs from the design element of the design module repeated to form the unitary array of design modules, wherein defining the new design element comprises aligning an edge of the first design module with an edge of the second design module so that the first design module and the second design module are in an edge-to-edge relationship, and so that the design element of the first design module and the design element of the second module are aligned with one another to define the new design element that differs from the design element of the design module.

59. The method of claim 56, wherein the first design module and the second design module are adjacent to one another within the unitary array of design modules, and at least one of the background and the design element serves as a visual connection point between the first design module and the second design module.

60. The method of claim 56, wherein the first design module and the second design module are adjacent to one another within the unitary array of design modules, and the design element of the first design module and the design element of the second design module substantially abut and substantially align with one another so that the design element of the first design module and the design element of the second design module are substantially continuous.

61. The method of claim 56, wherein the first design module and the second design module are adjacent to one another within the unitary array of design modules, and the design element of the first design module and the design element of the second design module are at least partially misaligned with one another so that a discontinuity is created between the design element of the first design module and the design element of the second design module.

62. The method of claim 46, wherein preparing the design module comprises arranging a first arrangement of hues along a first peripheral edge of the design module, and arranging a second arrangement of hues along a second peripheral edge of the design module, wherein the first arrangement of hues is substantially identical to the second arrangement of hues.

63. The method of claim 62, wherein the first arrangement of hues is arranged so that the first arrangement of hues is symmetric about a midpoint of the first peripheral edge, and the second arrangement of hues is arranged so that the second arrangement of hues is symmetric about a midpoint of the second peripheral edge.

64. The method of claim 63, wherein preparing the design module further comprises arranging a third arrangement of hues adjacent to a third peripheral edge of the design module, and arranging a fourth arrangement of hues adjacent to a fourth peripheral edge of the design module, wherein the third arrangement of hues and the second arrangement of hues are substantially identical to the first arrangement of hues and the second arrangement of hues.

65. The method of claim 46, wherein preparing the design module comprises providing the design module with a design element, and repeating the design module to form the unitary array of design modules comprises arranging the design modules in an edge-to-edge relationship with one another, wherein arranging the design modules in an edge-to-edge relationship with one another defines a new design element that differs from the design element of the design module.

66. The method of claim 65, wherein arranging the design modules in the edge-to-edge relationship comprises arranging the design modules so that the first design module and the second design module are adjacent to one another in the edge-to edge relationship within the unitary array of design modules, wherein the edge-to-edge alignment of the first design module and the second design module is a perfect alignment, such that the design element of the first design module and the design element of the second design module substantially abut and substantially align with one another so that the design element of the first design module is substantially continuous with the design element of the second design module.

67. The method of claim 65, wherein arranging the design modules in the edge-to-edge relationship comprises arranging the design modules so that the first design module and the second design module are adjacent to one another in the edge-to edge relationship within the unitary array of design modules, wherein the edge-to-edge alignment of the first design module and the second design module is an imperfect alignment such that the design element of the first design module and the design element of the second design module are misaligned with one another so that a discontinuity is created between the design element of the first design module and the design element of the second design module.

68. A method of making a textile pattern, the method comprising:

preparing a design module, the design module being substantially square in shape and including at least two visually distinct hues;

repeating the design module in a tiled configuration to form an array of design modules, wherein the design modules of the array are contiguous with one another so that the array of design modules is a unitary array of design modules, wherein the design modules of the unitary array of design modules are configured so that the unitary array of design modules includes a plurality of visually distinct design modules, the visually distinct modules of the unitary array of design modules being at least one of rotated and inverted relative to the design module repeated to form the array of design modules, wherein the unitary array of design modules including the visually distinct design modules defines a motif for being repeated along a length and a width of a continuous textile web to define the textile pattern; and forming the textile pattern, wherein forming the textile pattern comprises repeating the motif along the length and width of the continuous textile web so that the continuous textile web comprises a first occurrence of the motif and a second occurrence of the motif, the first occurrence of the motif and the second occurrence of the motif each comprising the unitary array of design modules.

69. The method of claim 68, wherein the first occurrence of the motif and the second occurrence of the motif are adjacent to one another along the length or width of the continuous textile web.

70. The method of claim 68, wherein the continuous textile web further comprises at least a third occurrence of the motif.

71. The method of claim 68, wherein the continuous textile web comprises a carpet.

72. The method of claim 71, wherein the carpet comprises a roll good.

73. The method of claim 68, wherein preparing the design module comprises preparing the design module so that the design module is substantially symmetrical about a first diagonal centerline extending between a first pair of diagonally opposed corners of the design module.

74. The method of claim 73, wherein preparing the design module further comprises preparing the design module so that the design module is symmetrical about a second diagonal centerline extending between a second pair of diagonally opposed corners of the design module, the first diagonal centerline being orthogonal to the second diagonal centerline.

75. The method of claim 68, wherein preparing the design module comprises preparing the design module so that the design module is asymmetrical about a first diagonal centerline extending between a first pair of diagonally opposed corners of the design module.

76. The method of claim 75, wherein preparing the design module further comprises preparing the design module so that the design module is asymmetrical about a second diagonal centerline extending between a second pair of diagonally opposed corners of the design module, the first diagonal centerline being orthogonal to the second diagonal centerline.

77. The method of claim 75, wherein preparing the design module further comprises preparing the design module so that the design module is symmetrical about a second diagonal centerline extending between a second pair of diagonally opposed corners of the design module, the first diagonal centerline being orthogonal to the second diagonal centerline.

78. The method of claim 68, wherein preparing the design module further comprises preparing the design module so that the design module includes a background comprising a first hue, and a design element comprising a second hue, the second hue being different from the first hue.

79. The method of claim 78, wherein the unitary array of design modules includes at least one design element that differs from the design element of the design module repeated to form the unitary array of design modules.

80. The method of claim 78, wherein repeating the design module to form the unitary array of design modules comprises arranging the design modules so that the first design module and the second design module are adjacent to one another within the unitary array of design modules, and the method comprises defining a new design element that differs from the design element of the design module repeated to form the unitary array of design modules, wherein defining the new design element comprises aligning an edge of the first design module with an edge of the second design module so that the first design module and the second design module are in an edge-to-edge relationship, and so that the design element of the first design module and the design element of the second module are aligned with one another to define the new design element that differs from the design element of the design module.

81. The method of claim 78, wherein the first design module and the second design module are adjacent to one another within the unitary array of design modules, and at least one of the background and the design element serves as a visual connection point between the first design module and the second design module.

82. The method of claim 78, wherein the first design module and the second design module are adjacent to one another within the unitary array of design modules, and the design element of the first design module and the design element of the second design module substantially abut and substantially align with one another so that the design element of the first design module and the design element of the second design module are substantially continuous.

83. The method of claim 78, wherein the first design module and the second design module are adjacent to one another within the unitary array of design modules, and the design element of the first design module and the design element of the second design module are at least partially misaligned with one another so that a discontinuity is created between the design element of the first design module and the design element of the second design module.

84. The method of claim 68, wherein preparing the design module comprises arranging a first arrangement of hues along a first peripheral edge of the design module, and arranging a second arrangement of hues along a second peripheral edge of the design module, wherein the first arrangement of hues is substantially identical to the second arrangement of hues.

85. The method of claim 84, wherein the first arrangement of hues is arranged so that the first arrangement of hues is symmetric about a midpoint of the first peripheral edge, and the second arrangement of hues is arranged so that the second arrangement of hues is symmetric about a midpoint of the second peripheral edge.

86. The method of claim 85, wherein preparing the design module further comprises arranging a third arrangement of hues adjacent to a third peripheral edge of the design module, and arranging a fourth arrangement of hues adjacent to a fourth peripheral edge of the design module, wherein the third arrangement of hues and the second arrangement of hues are substantially identical to the first arrangement of hues and the second arrangement of hues.

87. The method of claim 68, wherein preparing the design module comprises providing the design module with a design element, and repeating the design module to form the unitary array of design modules comprises arranging the design modules in an edge-to-edge relationship with one another, wherein arranging the design modules in an edge-to-edge relationship with one another defines a new design element that differs from the design element of the design module.

88. The method of claim 87, wherein arranging the design modules in the edge-to-edge relationship comprises arranging the design modules so that the first design module and the second design module are adjacent to one another in the edge-to edge relationship within the unitary array of design modules, wherein the edge-to-edge alignment of the first design module and the second design module is a perfect alignment, such that the design element of the first design module and the design element of the second design module substantially abut and substantially align with one another so that the design element of the first design module is substantially continuous with the design element of the second design module.

89. The method of claim 87, wherein arranging the design modules in the edge-to-edge relationship comprises arranging the design modules so that the first design module and the second design module are adjacent to one another in the edge-to edge relationship within the unitary array of design modules, wherein the edge-to-edge alignment of the first design module and the second design module is an imperfect alignment such that the design element of the first design module and the design element of the second design module are misaligned with one another so that a discontinuity is created between the design element of the first design module and the design element of the second design module.

* * * * *